(12) United States Patent
Hirayama et al.

(10) Patent No.: US 6,916,557 B2
(45) Date of Patent: Jul. 12, 2005

(54) PERPENDICULAR MAGNETIC RECORDING MEDIA

(75) Inventors: Yoshiyuki Hirayama, Kokubunji (JP); Hiroyuki Nakagawa, Yokohama (JP); Hiroaki Nemoto, Oiso (JP); Ichiro Tamai, Hachioji (JP); Ikuko Takekuma, Odawara (JP)

(73) Assignee: Hitachi Global Storage Technologies Japan, Ltd., Kanagawa-ken (JP)

(*) Notice: Subject to any disclaimer, the term of this patent is extended or adjusted under 35 U.S.C. 154(b) by 10 days.

(21) Appl. No.: 10/372,335

(22) Filed: Feb. 25, 2003

(65) Prior Publication Data

US 2004/0038083 A1 Feb. 26, 2004

(30) Foreign Application Priority Data

Aug. 26, 2002 (JP) ........................... 2002-244473
Jan. 15, 2003 (JP) ........................... 2003-006507

(51) Int. Cl.[7] .......................... G11B 5/66; G11B 5/70
(52) U.S. Cl. ........................ 428/694 TS; 428/694 TM
(58) Field of Search ............... 428/694 TS, 694 TM, 428/900, 336, 611

(56) References Cited

U.S. PATENT DOCUMENTS 6,602,621 B2 * 8/2003 Matsunuma et al. ... 428/694 TS

FOREIGN PATENT DOCUMENTS

| JP | 6-295431 | 4/1993 |
| JP | 7-73429 | 8/1993 |
| JP | 2001-23140 | 7/1999 |
| JP | 2001-155329 | 11/1999 |
| JP | 2002-25032 | 6/2000 |

OTHER PUBLICATIONS

Machine Translation of JP 07–073429.*

* cited by examiner

*Primary Examiner*—Holly Rickman
(74) *Attorney, Agent, or Firm*—Reed Smith LLP; Stanley P. Fisher, Esq.; Juan Carlos A. Marquez, Esq.

(57) ABSTRACT

A perpendicular magnetic recording medium includes an intermediate film formed of a plurality of layers between a soft magnetic film and a perpendicular magnetization film. The intermediate film includes at least two layers, i.e., an oxygen-containing layer, or a nonmetallic element-containing layer containing nitrogen, silicon or carbon, and a metallic layer formed on a surface side of the oxygen-containing layer or the nonmetallic element-containing layer. The metallic layer includes a plurality of isolated island-shaped structures. Crystal grains of the perpendicular magnetization film are formed so as to correspond to the isolated island-shaped structures. As a result, a high recording density is obtained.

8 Claims, 13 Drawing Sheets

PERPENDICULAR MAGNETIC RECORDING MEDIA

BACKGROUND OF THE INVENTION

1. Field of the Invention

The present invention relates to magnetic recording media on which a large amount of information can be recorded, and in particular to magnetic recording media suitable for high density magnetic recording.

2. Description of the Related Art

As the information-oriented society advances, information content handled every day increases, and consequently a magnetic storage device having a larger capacity is in great demand. In order to cope with this, development of a magnetic head having high sensitivity and magnetic recording media with low noise is being conducted vigorously. In the longitudinal magnetic recording now in practical use, adjacent magnetizations recorded on the medium are opposed to each other. For increasing the linear recording density, therefore, it is necessary to increase the coercive force of the recording layer and decrease the film thickness. If the coercive force of the recording layer becomes large, however, a problem of insufficient writing capability of the recording head occurs. If the thickness of the recording layer becomes thin, a problem that recorded information is lost by thermal demagnetization occurs. Because of these problems, it has become difficult to improve the recording density by using the current longitudinal magnetic recording.

As means for overcoming these problems, the perpendicular magnetic recording is now being studied. In the perpendicular magnetic recording, adjacent magnetizations are not opposed to each other, and consequently the high density recording state is stable. Therefore, the perpendicular magnetic recording is considered to be a technique that is essentially suitable for high density recording. Furthermore, the recording efficiency can be increased by combining a single-pole-type magnetic recording head with a double-layer perpendicular magnetic recording medium having a soft magnetic underlayer. Thus it is considered that it is possible to cope with an increase in coercive force of the recording film. For implementing high density recording by using the perpendicular magnetic recording, it is necessary to develop a perpendicular magnetic recording medium having low noise and resistance to thermal demagnetization.

As for the recording layer of the perpendicular magnetic recording medium, a Co—Cr—Pt alloy film put into practical use in longitudinal magnetic recording media, and a super-lattice film formed by laminating a Co layer and a Pd layer having high magnetic anisotropy are being studied. For reducing noise of media using these recording layers and improving the thermal demagnetization characteristic, it is important to make crystal grains forming the recording layer fine and uniform and implement magnetic isolation of the crystal grains.

In the case of a longitudinal magnetic recording medium using a Co—Cr—Pt alloy film as the recording layer, a low noise characteristic is obtained by forming fine and magnetically isolated crystal grains by means of segregation to the grain boundary. In the case of a perpendicular magnetic recording medium, however, crystal grains of the recording layer have a structure in which c-axes of hexagonal closed packed structures are aligned vertical to the film plane, and adjacent crystal grains differs only slightly in crystal orientation in the in-plane direction. Therefore, crystal grains are united to each other and enlarged in the recording film forming process, or magnetic isolation of crystal grains becomes insufficient because of insufficient Cr segregation to the grain boundaries. It is thus difficult to obtain the low noise characteristic.

It is considered that it is effective in solving such problems to form an intermediate layer between a recording layer and a soft magnetic underlayer and control the growth of crystal grains in the recording layer by using the intermediate layer. As for studies concerning the intermediate layer of perpendicular magnetic recording media, a soft magnetic intermediate film of an island structure having a crystal plane of [111] is disclosed in, for example, JP-A-6-295431. Its object is to improve the orientation property of the recording layer by using the intermediate layer, and the magnetic isolation of crystal grains and the effect of noise reduction are not described therein. Use of an oxide layer having superfluous oxygen and poor crystallinity is disclosed in JP-A-7-73429. Its object is to effectively disconnect magnetic and crystal-structural relations between a soft magnetic underlayer and a recording layer and prevent disappearance of magnetization of the recording layer and reduction of the coercive force. In addition, it is disclosed in JP-A-2001-23140 that a MgO film is suitable for an intermediate layer of a Co—Cr alloy recording layer. Its object is to increase perpendicular magnetic anisotropy energy of a recording magnetic film by controlling the orientation property of magnetic crystal grains.

In these studies mentioned above, magnetic isolation of crystal grains and the effect of noise reduction are not described therein. For obtaining a perpendicular magnetic recording medium on which high density recording can be conducted, a technique of an intermediate layer for controlling crystal grains of the recording layer and reducing noise is required.

On the other hand, in the case of a perpendicular magnetic recording medium using a super-lattice film formed by stacking a Co layer and a Pd layer as the recording layer, magnetic interaction between crystal grains of the recording layer is very strong, and consequently the transition noise is large and high density recording is impossible. In order to solve this problem, a technique of magnetically isolating crystal grains of the super-lattice film is being studied. It is disclosed in, for example, JP-A-2002-25032, that crystal grains of the recording layer are crystallographically isolated and magnetically isolated by making the recording film contain B and O. For controlling the orientation property and size of crystal grains, however, a new technique concerning the intermediate layer is required. As for the study concerning an intermediate layer or an underlayer, it is disclosed in, for example, JP-A-2001-155329, to use an underlayer composed of composite materials including metal, such as Pd or Pt, having a face-centered cubic structure and an oxide such as $Al_2O_3$ or MgO. Its object is to make crystal grains of the recording layer small, make magnetic interaction between grains weak, and reduce transition noise remarkably. For preventing the increase of crystal grain diameter of the recording layer, however, it is necessary to divide the recording layer by using division layers. Thus, it is considered that the control of size and orientation property of crystal grains is insufficient.

For obtaining a perpendicular magnetic recording medium on which high density recording can be conducted, a new technique concerning an intermediate layer for controlling crystal grains of the recording layer is required. As for a condition required of the intermediate layer of the double-layer perpendicular magnetic recording medium on which high density recording can be conducted, it is necessary not only to conduct structure control of the recording layer but also to make the film thickness small in order to prevent the degradation of the recording efficiency. In the case where the intermediate layer is thick, the distance between the magnetic pole of the recording head and the soft magnetic underlayer becomes long and it is expected that the recording efficiency falls and the recording resolution falls. Therefore, a technique of a thin intermediate layer capable of conducting structure control of the recording layer is required.

Judging the conventional technique concerning the intermediate layer of the perpendicular magnetic recording medium from the viewpoint of the grain control of the recording layer, making grains fine and uniform and magnetic isolation are not taken into consideration in the case where orientation property has been improved, and orientation property improvement and making grains fine and uniform are not taken into consideration in the case where magnetic isolation has been promoted. From the viewpoint of the thickness of the intermediate layer, making the film thickness thin is not sufficiently taken into consideration. For these reasons, there are problems of high medium noise, weakness for thermal fluctuation, low recording efficiency and low recording resolution. Because of these problems, it is impossible to fabricate a perpendicular magnetic recording medium suitable for high density recording.

SUMMARY OF THE INVENTION

An object of the present invention is to provide a perpendicular magnetic recording medium that is low in medium noise, resistive to thermal fluctuation, high in recording efficiency, and high in recording resolution, by magnetically isolating crystal grains of a recording layer of the perpendicular magnetic recording medium, making the crystal grains fine and uniform, and forming the intermediate layer as a thin film.

According to one feature of the present invention, in a perpendicular magnetic recording medium having a perpendicular magnetization film formed over a nonmagnetic substrate via a soft magnetic underlayer, a nonmetallic element-containing layer containing oxygen, nitrogen, silicon or carbon is formed between the soft magnetic underlayer and the perpendicular magnetization film, and a metallic layer having structures isolated in island forms is formed on the surface of the nonmetallic element-containing layer. It is desirable that the metallic layer having the structures isolated in the island forms is in the range of 0.1 nm to 2 nm in average thickness. Owing to this thickness setting, the metallic layer is formed as a plurality of convex structures isolated in island forms without completely covering the whole surface of the nonmetallic element-containing layer, and the size becomes fine. By growing crystal grains of the recording layer by taking the convex structures isolated in island forms respectively as nuclei, a recording layer formed of fine and magnetically isolated crystal grains can be obtained.

As a method for controlling the crystal grains of the recording layer by using the intermediate layer, crystal boundaries of the intermediate layer itself may be formed clearly and the recording layer may be formed directly on the intermediate layer. For forming such an intermediate layer, however, it is necessary to make the thickness large. When the thickness of the intermediate layer is small, the intermediate layer is formed of fine crystal grains or becomes an amorphous structure, and consequently the intermediate layer typically becomes nearly uniform film and clear crystal grain boundaries are not formed. It is also conceivable to provide the intermediate layer with roughness to control the crystal grains of the recording layer. For giving roughness, however, it is also necessary to make the film thickness large. It is considered that provision of the roughness is facilitated by insertion of an oxide layer. In this case as well, a larger film thickness brings about a greater effect. In addition, with the provision of the roughness alone, it is difficult to control the crystal grain size and a problem remains in making crystal grains fine and uniform.

In order to cope with such problems, the present inventors have found that a metallic layer having structures isolated in island forms can be formed by forming the metallic layer on the surface of an oxygen containing layer so as to be in the range of 0.1 nm to 2 nm in average thickness and a recording layer formed of fine and magnetically isolated crystal grains by growing crystal grains of the recording layer while taking the isolated island structures (convex structures) as nuclei.

The oxygen-containing layer is small in surface energy. If a metallic layer which is relatively large in surface energy is formed on the surface of the oxygen containing layer, therefore, structures isolated in island forms are formed without covering the surface of the oxygen-containing layer completely and uniformly with the metallic layer, only in the case where the thickness is extremely thin. In addition, the size is fine, and adjustment can be conducted by using the material, film thickness and formation temperature of the metallic layer. It is easy to attain a diameter of 10 nm or less. The island-shaped metallic layer becomes nuclei of crystal growth for the intermediate layer or the recording layer formed thereon, and plays a role in controlling the orientation property. On the other hand, it is considered that the oxygen-containing layer left around the island-shaped metallic layer supplies oxygen to or introduces defects into the intermediate layer or the recording layer formed thereon and contributes to formation of crystal grain boundaries in the recording layer. In the crystal grain boundaries thus formed, there are a large number of lattice defects and the orientation property is disordered. For example, in the case of the Co—Cr alloy metallic recording layer, therefore, Cr segregation to grain boundaries is promoted. In the case of other recording layers as well, additive elements are apt to segregate to grain boundaries. It is thus considered that a great effect is exhibited in magnetic isolation of crystal grains. Furthermore, since the oxygen-containing layer has also an effect of preventing adjacent crystal grains from being united to each other, it is considered to be helpful in preventing an increase of crystal grain size and making the crystal grains uniform. As for the thickness of the intermediate layer, there is no problem even if the oxygen-containing layer is thin because the role of the surface thereof is important. Inclusive of other layers such as the orientation property control layer, the thickness of the whole intermediate layer can be made as thin as 3 nm or less.

As for a material used for the island-shaped metallic layer formed on the surface of the oxygen-containing layer, it is necessary to select a material that is hard to react with the oxygen containing layer. For example, high melting point metal, such as Ta, W, Nb, Mo or Ru, or an alloy containing such a high melting point metallic element as its chief ingredient, noble metal such as Pd, Pt, Au or Ag, or an alloy such a noble metal element as its chief ingredient is suitable. Even if Ni or Co, or an alloy containing the metallic element Ni or Co is used, the effects of the present invention can be obtained.

As for providing the metallic layer formed on the surface of the oxygen-containing layer with structures isolated in island forms, the average thickness of the metallic layer differs according to its material and it is considered that the average thickness of the metallic layer mainly depends on the melting point of the material. For example, in the case of a high melting point metal Ta, W, Nb, Mo or Ru, or an alloy containing such a high melting point metal as its chief ingredient, the average thickness of the metallic layer is in the range of 0.1 nm to 1 nm. In the case of Ni or Co, or an alloy containing such a metallic element as its chief ingredient, the average thickness of the metallic layer is in the range of 0.5 nm to 1.2 nm. In the case of Pd, Pt, Au or Ag, or an alloy containing such a metallic element as its chief ingredient, the average thickness of the metallic layer is in the range of 0.5 nm to 2.0 nm.

When the metallic layer is formed on the surface of the oxygen-containing layer, the effect of the present invention is made greater by setting the average thickness equal to a smaller value in the above described average thickness range, in the case where a substrate temperature is as low as, for example, below 100° C. In the case where the substrate temperature is as high as, for example, above 200° C., the effect of the present invention is made greater by setting the average thickness equal to a larger value in the above described average thickness range As the material used for the oxygen-containing layer, MgO is desirable. Whether the Co—Cr—Pt alloy film is used as the recording layer or the super-lattice film obtained by stacking the Co layer and the Pd layer is used as the recording layer, the crystal orientation property of the recording layer is made favorable by using the MgO film as the oxygen-containing layer. The crystal orientation property of the recording layer is further improved by forming a metallic film for orientation control before forming the MgO film.

Even if the recording layer is formed directly on the island-shaped metallic layer, the effects of the present invention are obtained. For obtaining greater effects, it is more desirable to form the recording layer after a metallic intermediate layer containing oxygen has been formed on the island-shaped metallic layer. It is considered that the metallic intermediate layer containing oxygen functions to form clear crystal grain boundaries formed of oxides on the oxygen-containing layer left around the island-shaped metallic layer including a plurality of isolated island structures, and these crystal grain boundaries function to promote magnetic isolation of the crystal grains in the recording layer. A noble metal element Pd, Pt, Au or Ag is desirable as the main component of the metallic intermediate layer containing oxygen, and the metallic intermediate layer is desired to contain B or Si as the added element. The noble metal element serves as nuclei for forming crystal grains and growing the recording layer, and plays a role in controlling the orientation property of the recording layer. The added element plays a role in forming crystal grain boundaries in cooperation with oxygen.

Also in the case where a layer containing nitride, silicon or carbon is used instead of the oxygen-containing layer, similar effects are obtained. The reason is considered to be that the layer containing nitride, silicon or carbon is small in surface energy in the same way as the oxygen containing layer and the metallic layer formed on the surface thereof becomes structures isolated in island forms.

If information is recorded on the perpendicular magnetic recording medium by a magnetic head that includes a recording section formed of a single-pole-type head and a reproducing section formed of a giant magnetic resistance effect device or a magnetic resistance effect tunnel junction film, then a sufficient signal strength in high recording densities can be obtained and highly reliable magnetic storage apparatus having a high recording density can be implemented.

Other objects, features and advantages of the invention will become apparent from the following description of the embodiments of the invention taken in conjunction with the accompanying drawings.

BRIEF DESCRIPTION OF THE DRAWINGS

FIGS. 6A to 6H are diagrams showing the surface shape of a Ta intermediate layer formed on a MgO intermediate layer and measured by using atomic force microscope, in which FIGS. 6A and 6E are respectively a schematic diagram and a height profile showing a surface shape in the case where a Ta intermediate layer having a thickness of 0.1 nm is formed on a MgO intermediate layer, FIGS. 6B and 6F are respectively a schematic diagram and a height profile showing a surface shape in the case where a Ta intermediate layer having a thickness of 0.3 nm is formed on a MgO intermediate layer, FIGS. 6C and 6G are respectively a schematic diagram and a height profile showing a surface shape in the case where a Ta intermediate layer having a thickness of 1.0 nm is formed on a MgO intermediate layer, and FIGS. 6D and 6H are respectively a schematic diagram and a height profile showing a surface shape in the case where a Ta intermediate layer having a thickness of 0.3 nm is formed on a Ni—Ta—Zr alloy intermediate layer without forming an MgO intermediate layer;

FIGS. 7A and 7B are schematic diagrams of a cross-sectional structure obtained when a cross-section of a perpendicular magnetic recording medium according to a first embodiment of the present invention is observed by using a transmission electron microscope, in which FIG. 7A shows a medium obtained by forming a Ta intermediate layer having a thickness of 0.3 nm on a MgO intermediate layer, and FIG. 7B shows a medium obtained by forming a Ta intermediate layer having a thickness of 1 nm on a MgO intermediate layer;

FIGS. 19A to 19C are schematic diagrams of a cross-sectional structure obtained when a cross-section of a perpendicular magnetic recording medium according to a fourth embodiment of the present invention is observed by using a transmission electron microscope, in which FIG. 19A shows a medium obtained by forming a Pd intermediate layer having a thickness of 1.5 nm and a Pd—B alloy intermediate layer having a thickness of 3 nm on a MgO intermediate layer, FIG. 19B shows a medium obtained by forming a Pd intermediate layer having a thickness of 3 nm and a Pd—B alloy intermediate layer having a thickness of 3 nm on a MgO intermediate layer, and FIG. 19C shows a medium obtained by forming a Pd intermediate layer having a thickness of 1.5 nm and a Pd—B alloy intermediate layer having a thickness of 20 nm without forming a MgO intermediate layer.

DETAILED DESCRIPTION OF THE EMBODIMENTS

Hereafter, embodiments of the present invention will be described with reference to the drawings.

<First Embodiment>

A perpendicular magnetic recording medium of the present embodiment is formed by using a sputtering system (C-3010) manufactured by Anelva Corporation. This sputtering system includes eight process chambers and one substrate introduction chamber, and the chambers are exhausted independently. After all process chambers are exhausted until the degree of vacuum becomes $1 \times 10^{-5}$ Pa or less, processes are executed in order by moving a carrier having a substrate mounted thereon to each process chamber. A magnetron sputter cathode of magnet rotation type is installed in a process chamber for sputtering, and film formation is conducted by using a target having a diameter of 110 mm. A metal film and a carbon film are formed by DC sputtering, and an oxide film is formed by RF sputtering. A lamp heater is installed in a process chamber for heating, and a substrate temperature is controlled by adjusting the power. The substrate temperature is measured by using a thermometer of radiation type.

Figure 1:
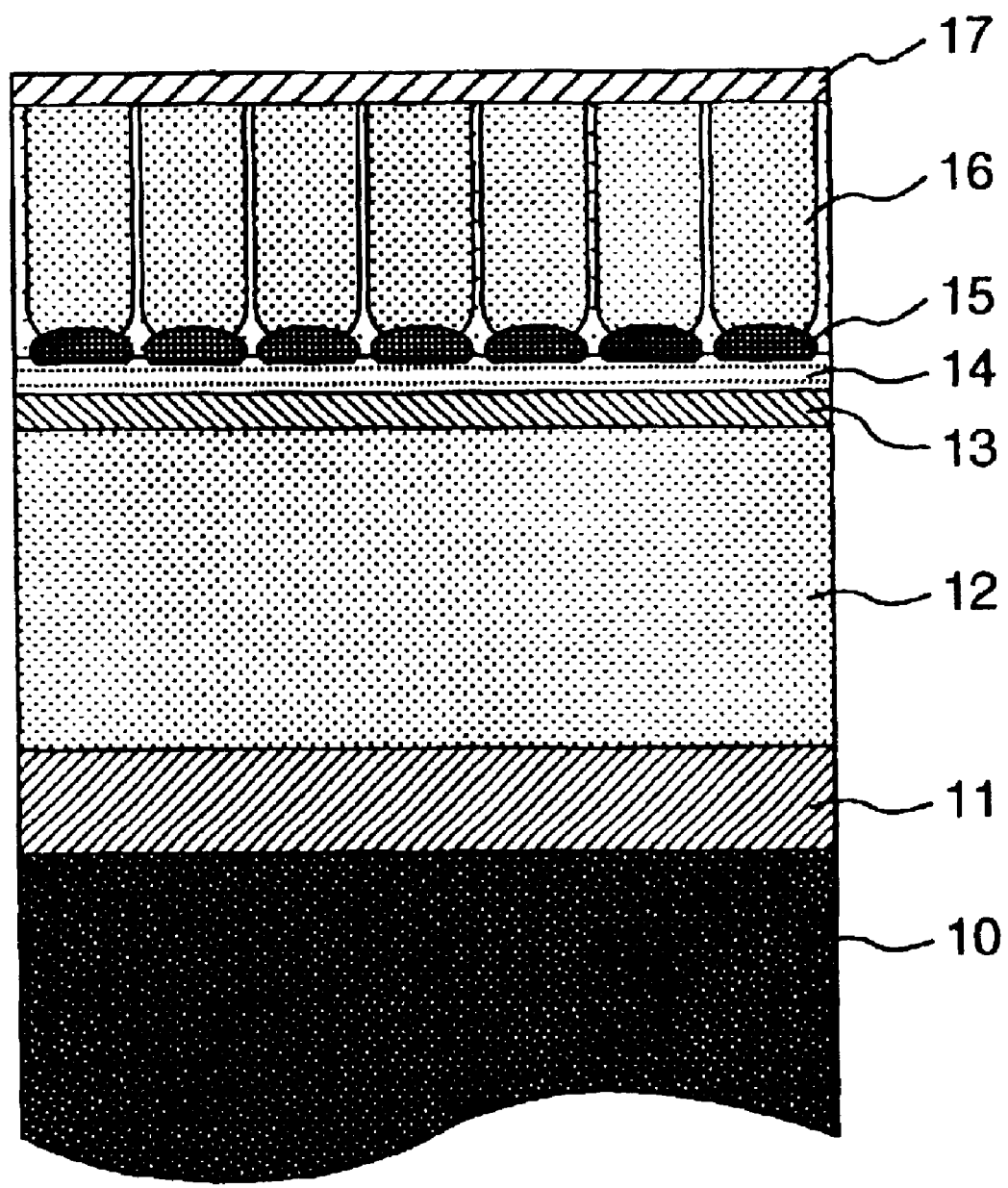
FIG. 1 is a schematic diagram showing a cross-sectional structure of each of perpendicular magnetic recording media according to first, second and third embodiments of the present invention.

FIG. 1 shows an embodiment of a perpendicular magnetic recording medium according to the present invention, and shows its cross-sectional structure diagram. Hereafter, a procedure for fabricating this medium will be described. As a substrate 10, crystallized glass having a thickness of 0.635 mm and a diameter of 65 mm is used. First, a seed layer 11 having a thickness of 30 nm composed of Ni-37.5 at % Ta-10 at % Zr alloy is formed on the substrate 10. Subsequently, a soft magnetic underlayer 12 having a thickness of 400 nm composed of Fe-8 at % Ta-12 at % C alloy is formed. Thereafter, heating is conducted by throwing in power of 1600 W to a lamp heater for 12 seconds. The substrate temperature reached at that time is approximately 450° C. Subsequently, after the substrate temperature has fallen, a first intermediate layer 13 having a thickness of 3 nm composed of Ni-37.5 at % Ta-10 at % Zr alloy is formed, and a second intermediate layer 14 having a thickness of 1 nm composed of MgO is formed, and a third intermediate layer 15 composed of Ta is formed thereon. The substrate temperature obtained immediately after the Ta intermediate layer has been formed is approximately 250° C. As for the Ta intermediate layer functioning as the island-shaped metallic layer, several kinds of samples differing in thickness were fabricated. Subsequently, a recording layer 16 having a thickness of 20 nm composed of Co-17 at % Cr-14at % Pt-4 at % B alloy is formed, and furthermore a carbon protection layer 17 having a thickness of 5 nm is formed. The thicknesses of the layers are average thicknesses, and they are adjusted by using the sputtering time and power. In the case where a Fe—Ta—C soft magnetic underlayer and a carbon protection film are formed, the sputtering power is set equal to 1000 W. In the case where a Ni—Ta—Zr first intermediate layer is formed, the sputtering power is set equal to 100 W. In the case where a Ta third intermediate layer is formed, the sputtering power is set equal to a value in the range of 70 to 300 W. In the case where a Ni—Ta—Zr seed layer, a MgO second intermediate layer, and a Co—Cr—Pt—B recording layer are formed, the sputtering power is set equal to 500 W. Argon is used as sputtering gas. The pressure is set equal to 0.5 Pa when conducting DC sputtering. The pressure is set equal to 2.0 Pa when conducting RF sputtering. After up to the carbon protection layer has been formed, a medium is taken out from a chamber, and an organic lubricant is applied to the surface of the medium to form a lubricant layer.

As a sample to be compared with the medium of the first embodiment, a perpendicular magnetic recording medium that is different in only the configuration of the intermediate layer and that is the same as the first embodiment in other film configurations and process conditions is fabricated as a first comparison example. As for the intermediate layer configuration of the medium of the first comparison example, unlike the medium of the first embodiment, the second intermediate layer 14 of MgO functioning as the oxygen containing layer is not formed, but the Ta intermediate layer 15 is formed directly on the first intermediate layer 13 of the Ni—Ta—Zr alloy. As for the Ta intermediate layer, several kinds of samples differing in thickness have been fabricated in the same way as the first embodiment.

Figure 2:
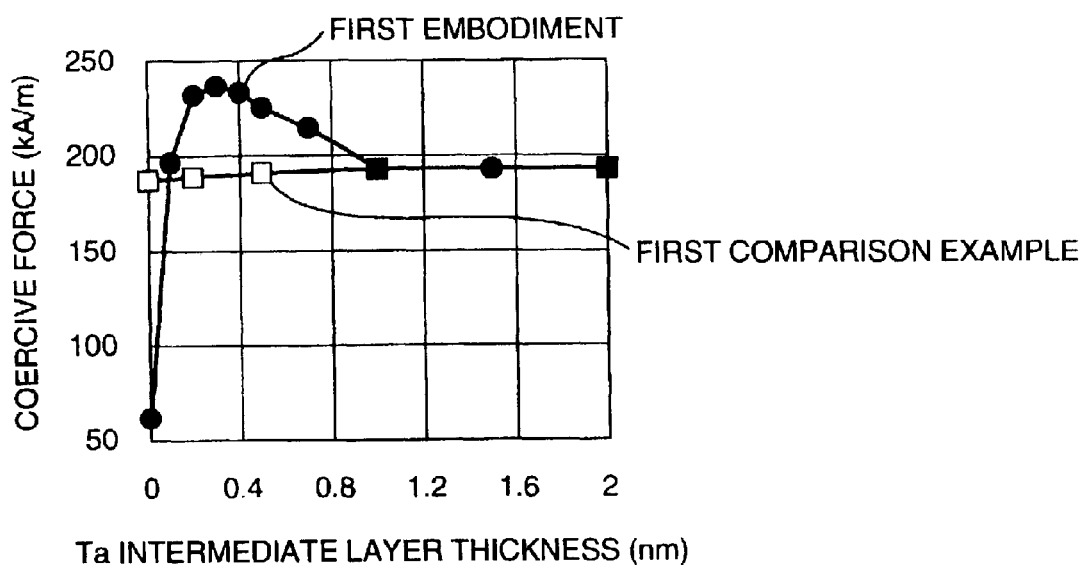
FIG. 2 is a diagram showing relations between coercive force and a Ta intermediate layer thickness of perpendicular magnetic recording media according to a first embodiment of the present invention and a first comparison example.
Figure 3:
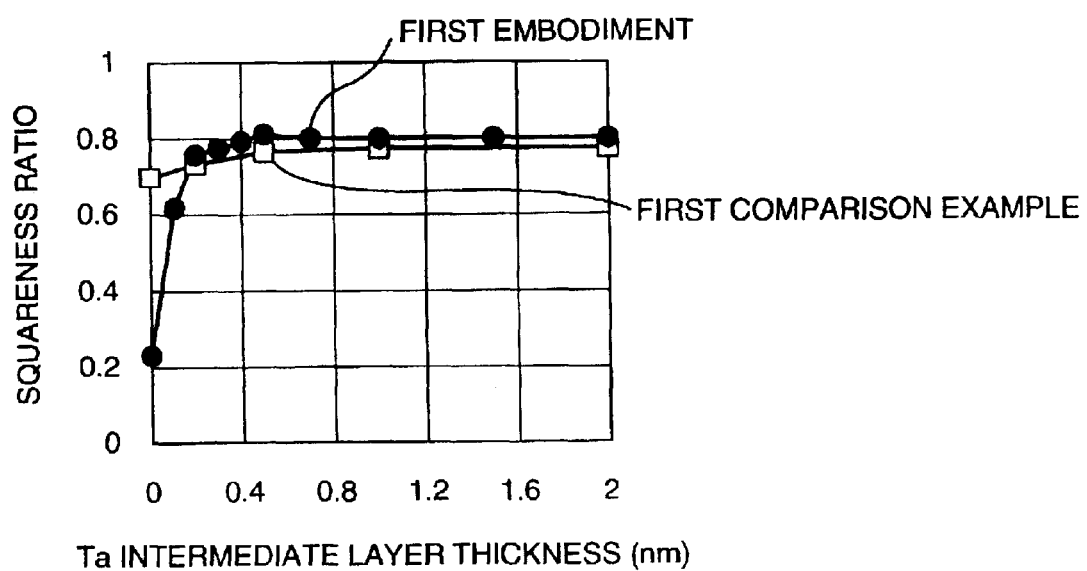
FIG. 3 is a diagram showing relations between a squareness ratio and a Ta intermediate layer thickness of perpendicular magnetic recording media according to a first embodiment of the present invention and a first comparison example.

Coercive force and a squareness ratio of the recording layer measured with respect to media according to the first embodiment and the first comparison example are shown in FIGS. 2 and 3, respectively. The coercive force and the squareness ratio are evaluated by using the following method. As a measuring device, a Kerr effect magnetometer is used. The environment is set so as to make the sample temperature become approximately 25° C. While applying a magnetic field in a direction perpendicular to the film surface of the sample, the Kerr rotation angle is detected and a Kerr loop is measured. Sweep of the magnetic field is conducted at a constant speed from +1760 kA/m to −1760 kA/m and from −1760 kA/m to +1760 kA/m in 64 seconds. Inclination correction and offset correction are conducted on the obtained Kerr loop, and the coercive force and squareness ratio are obtained.

FIG. 2 shows dependence of coercive force upon the thickness of the Ta intermediate layer (island-shaped metallic layer). In the first embodiment, the coercive force becomes large, only in the case where the Ta intermediate layer is stacked on the MgO intermediate layer and the thickness of the Ta intermediate layer is in the range of 0.2 nm to 0.7 nm. In the case where the Ta intermediate layer is thicker than 0.7 nm or the MgO intermediate layer is not formed as in the first comparison example, only the coercive force of 200 kA/m or less is obtained. As for the squareness ratio, the orientation property of the recording layer is poor and the squareness ratio is as low as 0.3 or less, in the case where the Co—Cr—Pt—B recording layer is formed directly on the MgO intermediate layer without using the Ta intermediate layer. By forming the Ta intermediate layer having a thickness of at least 0.2 nm on the MgO intermediate layer, however, the squareness ratio is restored to approximately 0.8 and the problem in orientation property of the recording layer is also eliminated.

Figure 4:
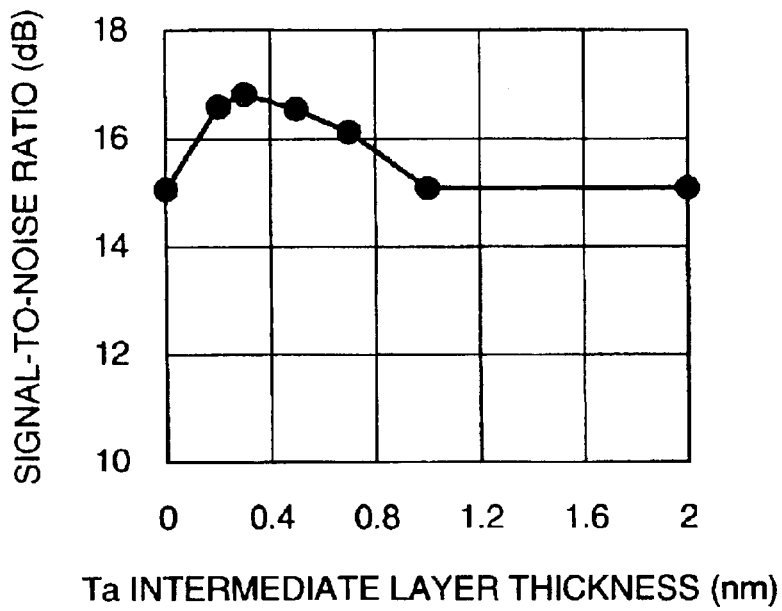
FIG. 4 is a diagram showing relations between a signal-to-noise ratio and a Ta intermediate layer thickness of perpendicular magnetic recording media according to a first embodiment of the present invention and a first comparison example.
Figure 5:
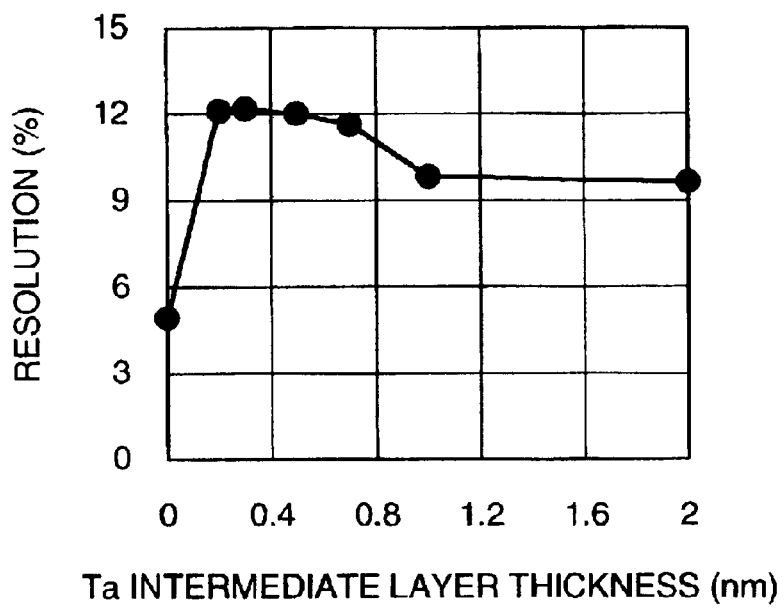
FIG. 5 is a diagram showing relations between a resolution and a Ta intermediate layer thickness of perpendicular magnetic recording media according to a first embodiment of the present invention and a first comparison example.

With respect to the media of the first embodiment and the first comparison example, evaluation of the recording and reproducing characteristic in the spin stand is conducted. A head used for the evaluation is a composite magnetic head including a reproduction device of a shield gap length of 62 nm and a track width of 120 nm utilizing the giant magnetic resistance effect, and a writing device of single-pole-type having a track width of 150 nm. Under the conditions of the peripheral speed of 10 m/s, skew angle of 0 degree and magnetic spacing of approximately 15 nm, the reproduction output and noise are measured. The signal-to-noise ratio of the medium is evaluated by means of a ratio of an isolated wave reproduction output at a line recording density of 1970 fr/mm (50 kFCI) to medium noise at a line recording density of 23620 fr/mm (600 kFCI). Furthermore, the recording resolution is evaluated by means of a ratio of a reproduction output at a linear recording density of 23620 fr/mm (600 kFCI) to a reproduction output at a linear recording density of 1970 fr/mm (50 kFCI). Evaluation results of the signal-to-noise ratio and resolution of the medium are shown in FIGS. 4 and 5, respectively. In the medium in which the Ta intermediate layer having a thickness in the range of 0.2 nm to 0.7 nm is formed on the MgO intermediate layer serving as the oxygen containing layer, improvement in the signal-to-noise ratio and resolution of the medium can be ascertained. The signal-to-noise ratio of the medium is improved by approximately 2 dB at the maximum, and the tendency of dependence of the signal-to-noise ratio upon the thickness of the Ta intermediate layer is the same as that of the coercive force shown in FIG. 2. This is considered to be a result of the fact that the island-shaped growth of the Ta intermediate layer promotes isolation of crystal grains of the Co—Cr—Pt—B recording layer and the medium noise is reduced.

Figure 6A:
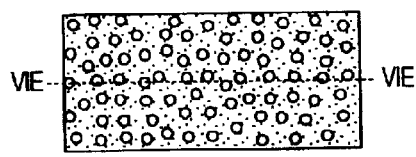
Figure 6E:
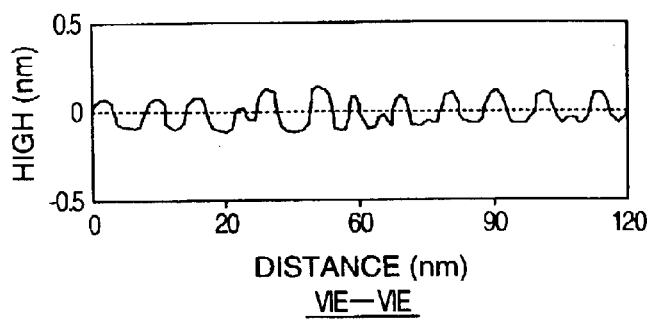
Figure 6B:
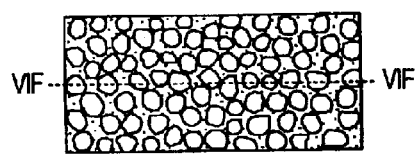
Figure 6F:
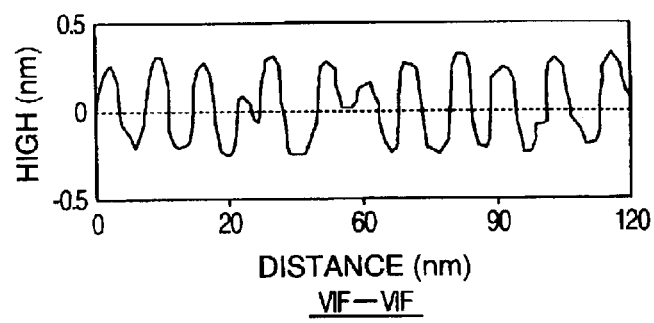
Figure 6C:
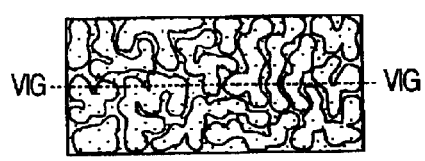
Figure 6G:
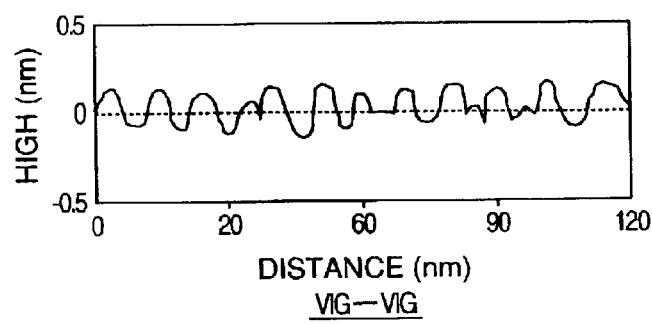
Figure 6D:
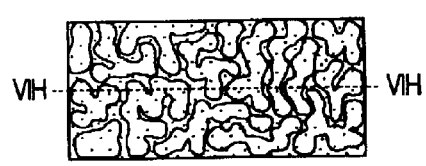
Figure 6H:
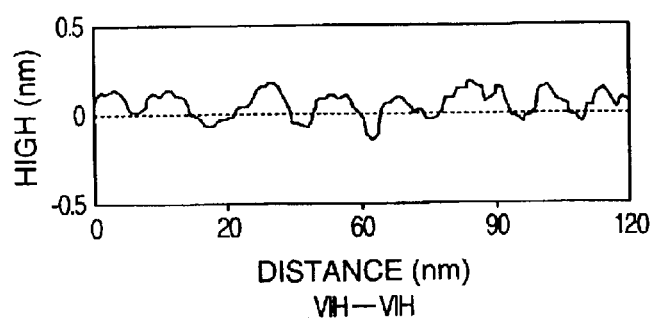

It is considered that such an improvement in the magnetic characteristic and the recording and reproducing characteristic is brought about by island-shaped growth of Ta formed on the MgO intermediate layer serving as the oxygen-containing layer. In order to ascertain this, in a process for fabricating a medium under the same film configuration and process condition as the first embodiment and the first comparison example, a sample is taken out from the sputtering system at the time point when the Ta intermediate layer is formed and the shape of the surface is observed by using an atomic force microscope. FIGS. 6A to 6D are schematic diagrams of surface shapes observed with respect to four kinds of samples, i.e., samples in the case where the Ta intermediate layer having a thickness of 0.1 nm is formed on the MgO intermediate layer (FIG. 6A), in the case where the Ta intermediate layer having a thickness of 0.3 nm is formed on the MgO intermediate layer (FIG. 6B), in the case where the Ta intermediate layer having a thickness of 1.0 nm is formed on the MgO intermediate layer (FIG. 6C), and in the case where the MgO intermediate layer is not formed, but the Ta intermediate layer having a thickness of 0.3 nm is formed directly on the Ni—Ta—Zr alloy intermediate layer (FIG. 6D). FIG. 6E, FIG. 6F, FIG. 6G and FIG. 6H show surface height profiles corresponding to a section indicated by VIE—VIE in FIG. 6A, a section indicated by VIF—VIF in FIG. 6B, a section indicated by VIG—VIG in FIG. 6C, and a section indicated by VIH—VIH in FIG. 6D, respectively. In the case where the Ta intermediate layer having a thickness of 0.3 nm is formed on the MgO intermediate layer, very large roughness is formed on the surface as shown in FIG. 6B and FIG. 6F. It is considered in this case that Ta is formed so as to have structures isolated nearly in island forms, i.e., form a plurality of isolated island structures. On the other hand, in the case where the Ta intermediate layer has a thickness of 0.1 nm, Ta is formed in island shapes, but the coverage factor is low and the roughness is also small as shown in FIG. 6A and FIG. 6E. On the other hand, in the case where the Ta intermediate layer has a thickness of 1.0 nm (FIG. 6C and FIG. 6G), and in the case where the MgO intermediate layer is not present (FIG. 6D and FIG. 6H), it is considered that the surface is covered with Ta nearly uniformly and consequently the roughness has become small.

In order to examine the difference in the medium structure in more detail, the cross-sectional structure of the medium is observed by using a transmission electron microscope having a high resolution with respect to two kinds of samples among the samples fabricated in the first embodiment, i.e., samples in the case where the Ta intermediate layer having a thickness of 0.3 nm is formed on the MgO intermediate layer, and in the case where the Ta intermediate layer having a thickness of 1.0 nm is formed on the MgO intermediate layer. In order to prevent crystal grains that are adjacent backward or forward in the observation direction from being observed in an overlapped state, the observation sample is shaped so as to be very thin. In the observation region, the observation sample is made as thin as approximately 10 nm and the cross-sectional structure is observed.

Figure 7A:
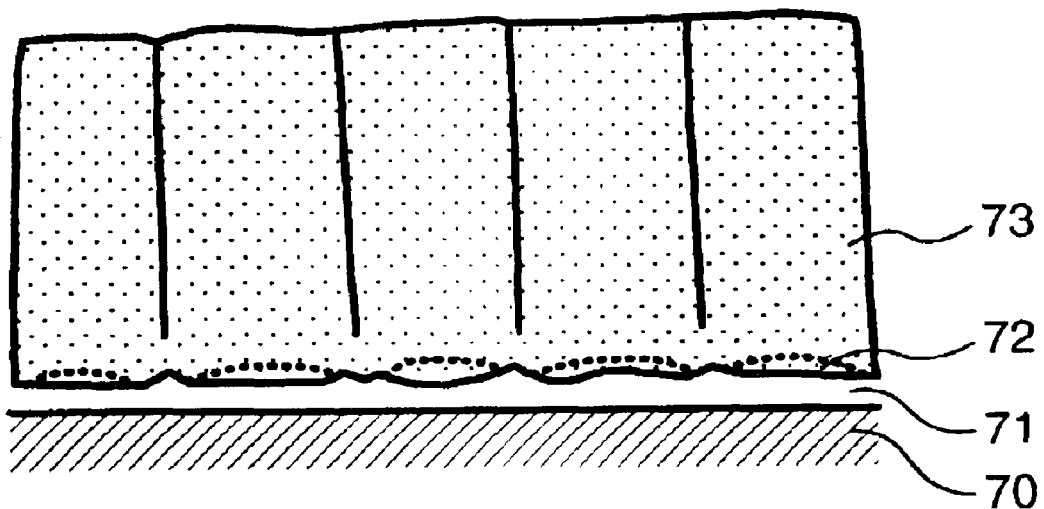
Figure 7B:
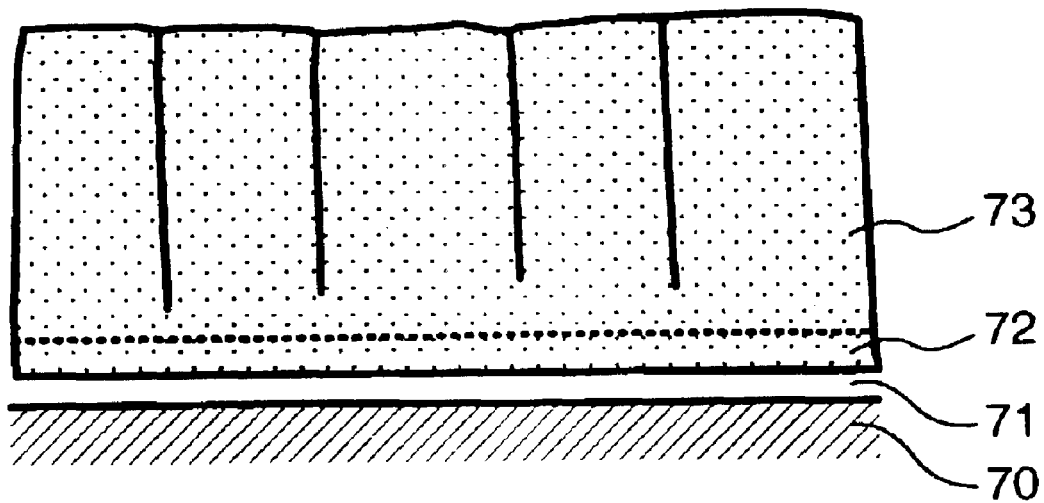

FIG. 7A and FIG. 7B are schematic sketches of transmission electron microscope images obtained by observing the cross-sectional structure of the media in the present embodiment with approximately one million and two hundred and fifty thousand magnifications. A MgO intermediate layer 71 containing oxygen is observed clearly with a bright contrast. A Ta intermediate layer 72 serving as the island-shaped metallic layer can be hardly recognized because the film thickness is small and the difference from a Co—Cr—Pt alloy recording layer 73 in contrast is small. The Co—Cr—Pt alloy recording layer 73 has a polycrystal structure divided in the film plane direction. Its grain diameter is approximately 10 nm, but the grain boundaries are not clear in some places. The reason is considered to be that grain boundaries exist obliquely with respect to the thickness direction of the observation sample. Comparing the case where the Ta intermediate layer has a thickness of 0.3 nm as shown in FIG. 7A with case where the Ta intermediate layer has a thickness of 1 nm as shown in FIG. 7B, a difference is observed in the shape of the MgO intermediate layer 71 containing oxygen. As for the shape of the MgO intermediate layer, in the case of FIG. 7A, its interface of the substrate side is flat whereas its interface of the surface side takes an uneven shape. On the other hand, in the case of FIG. 7B, as for the shape of the MgO intermediate layer 71, both the interface of the substrate side and the interface of the surface side are flat in the same way. In the case of FIG. 7A, the Ta interface layer having structures isolated in island forms is formed on the MgO intermediate layer, and consequently unevenness is formed on the surface side interface of the MgO intermediate layer. It can be confirmed that the effects of the present invention are obtained by the intermediate layer having such an uneven surface side interface.

Figure 8:
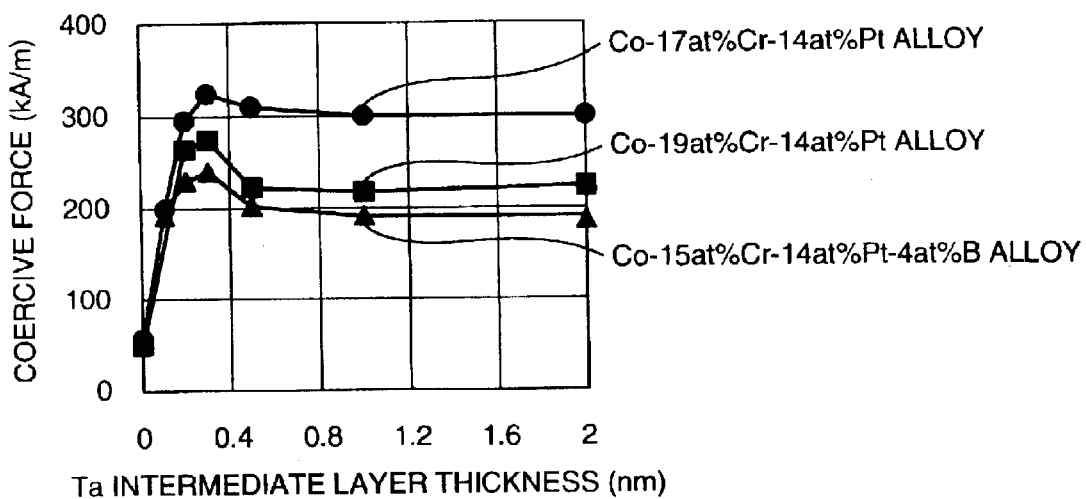
FIG. 8 is a diagram showing relations between coercive force and a Ta intermediate layer thickness of a perpendicular magnetic recording medium according to a first embodiment of the present invention obtained when a composition of a recording layer composed of a Co—Cr—Pt alloy is changed.

In order to examine the influence of the recording layer composition in the medium of the first embodiment, a perpendicular magnetic recording medium that is different from the medium of the first embodiment only in the recording layer composition and that is the same as the medium of the first embodiment in other film configurations and process conditions has been fabricated. Besides the Co-17 at % Cr-14 at % Pt-4 at % B alloy used in the first embodiment, a Co-15 at % Cr-14 at % Pt-4 at % B alloy, a Co-19 at % Cr-14 at % Pt alloy, and a Co-17 at % Cr-14 at % Pt alloy is used as the recording layer. The dependence of coercive force upon the thickness of the Ta intermediate layer is shown in FIG. 8. In the case of any recording layer composition, an increase of coercive force is recognized in the range of nearly the same thickness of the intermediate layer. It is ascertained that the effects of the present invention are obtained irrespective of the composition of the recording layer.

Figure 9:
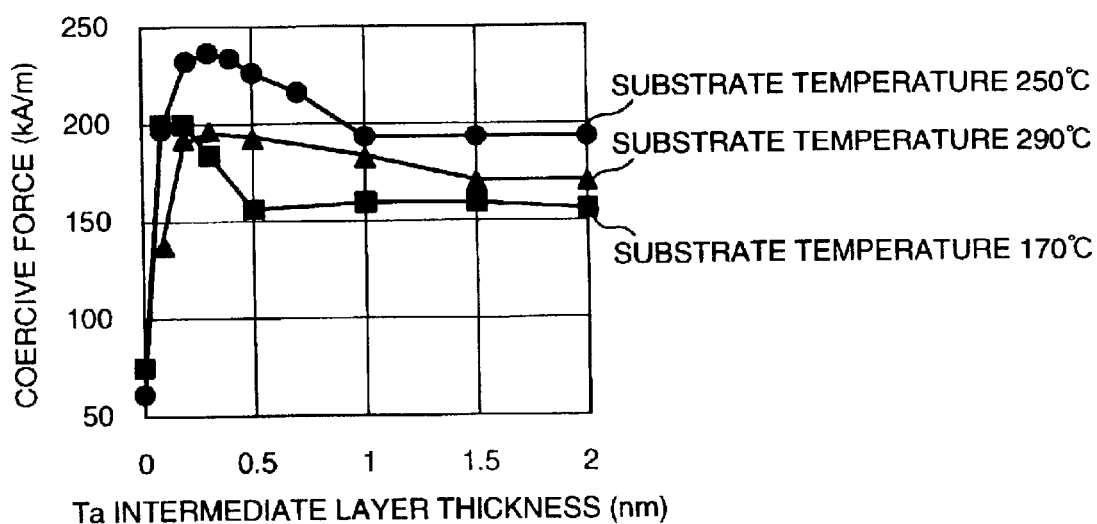
FIG. 9 is a diagram showing relations between coercive force and a Ta intermediate layer thickness of a perpendicular magnetic recording medium according to a first embodiment of the present invention obtained when a substrate temperature in forming the Ta intermediate layer is changed.
Figure 10:
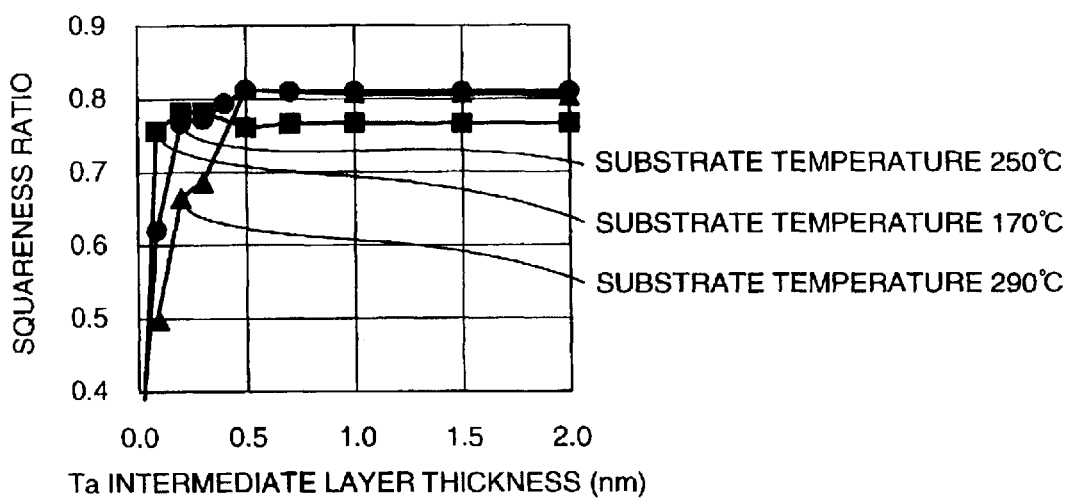
FIG. 10 is a diagram showing relations between a squareness ratio and a Ta intermediate layer thickness of a perpendicular magnetic recording medium according to a first embodiment of the present invention obtained when a substrate temperature in forming the Ta intermediate layer is changed.

In order to examine the influence of the substrate temperature in the medium of the first embodiment, a perpendicular magnetic recording medium that is different from the medium of the first embodiment only in the substrate temperature when forming the intermediate layer and the recording layer and that is the same as the medium of the first embodiment in other film configurations and process conditions has been fabricated. Waiting time before forming the Ni—Ta—Zr intermediate layer is adjusted so as to set the substrate temperature obtained immediately after the Ta intermediate layer is formed equal to 170° C., 250° C., and 290° C. Dependence of the coercive force and squareness ratio upon the thickness of the Ta intermediate layer is shown in FIG. 9 and FIG. 10, respectively. Although the recording layer having the same composition is used, the level of the coercive force differs according to the substrate temperature condition. The thickness range of the Ta intermediate layer in which the coercive force increases is the range of 0.1 to 0.4 nm when the substrate temperature is 170° C., the range of 0.2 to 0.7 nm when the substrate temperature is 250° C., and the range of 0.2 to 1 nm when the substrate temperature is 290° C. The reason why the thickness range of the Ta intermediate layer differs according to the substrate temperature at the time of forming is considered to be that the island-shaped structures of the Ta intermediate layer differ according to the temperature. When the substrate temperature is low, the island-shaped Ta intermediate layer is formed to be flatter. If the thickness increases even a little, therefore, it is considered that the Ta intermediate layer becomes a continuous film instead of the island shape and the effects of the present invention are not obtained. On the contrary, when the substrate temperature is high, the island-shaped Ta intermediate layer is formed as a shape having great swell. In the case where the thickness of the Ta intermediate layer is insufficient, therefore, the orientation property is poor and the squareness ratio falls because the factor of coverage of the MgO intermediate layer surface by the Ta intermediate layer is low. However, it is considered that the island-shaped structures are maintained even if the thickness of the Ta intermediate layer becomes as thick as approximately 1 nm. As a result of fabricating media with the substrate temperature changed as heretofore described, the thickness of the Ta intermediate layer at which the effects of the present invention are obtained is found to be in the range of 0.1 nm to 1 nm.

<Second Embodiment>

A perpendicular magnetic recording medium of a second embodiment is fabricated with a film configuration similar to that of the first embodiment and under the same process conditions as those of the first embodiment. As for the configuration of the intermediate layer, a Ni-37.5 at % Ta alloy is used as a first intermediate layer 13, MgO is used as a second intermediate layer 14, and a Ni-37.5 at % Ta alloy is used as a third intermediate layer 15. The substrate temperature immediately after formation of the Ni—Ta third intermediate layer is set to approximately 250° C., and a Co-17 at % Cr-14 at % Pt alloy is used as the recording layer.

As a sample to be compared with the medium of the second embodiment, a perpendicular magnetic recording medium that is different in only the configuration of the intermediate layer and that is the same as the second embodiment in other film configurations and process conditions is fabricated as a second comparison example. As for the intermediate layer configuration of the medium of the second comparison example, unlike the medium of the second embodiment, the second intermediate layer 14 of MgO containing oxygen is not formed, but the third intermediate layer 15 of the Ni—Ta alloy is formed directly on the first intermediate layer 13 of the Ni—Ta alloy. In other words, the intermediate layer is composed of only Ni—Ta alloys.

Figure 11:
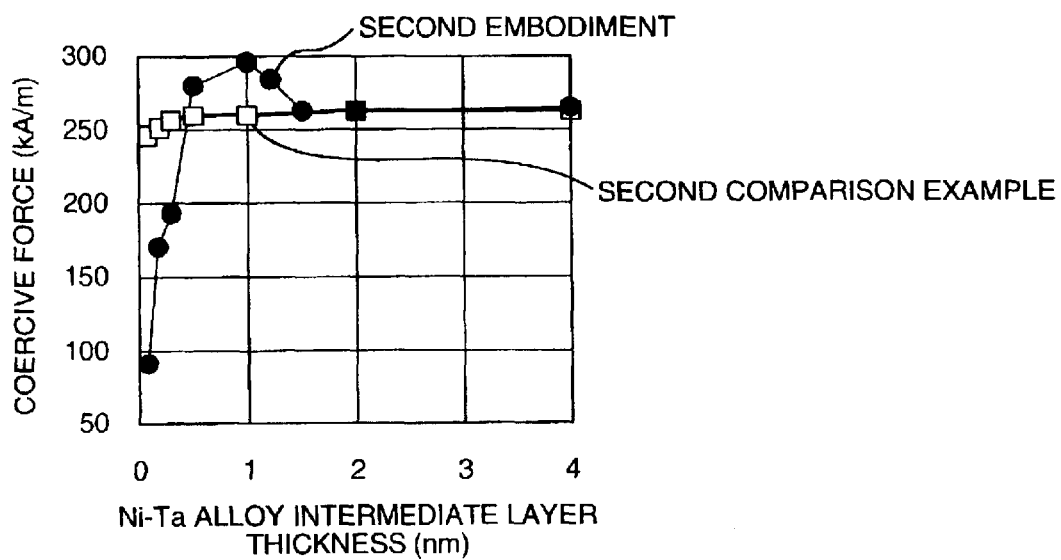
FIG. 11 is a diagram showing relations between coercive force and a Ni—Ta alloy intermediate layer thickness of perpendicular magnetic recording media according to a second embodiment of the present invention and a second comparison example.
Figure 12:
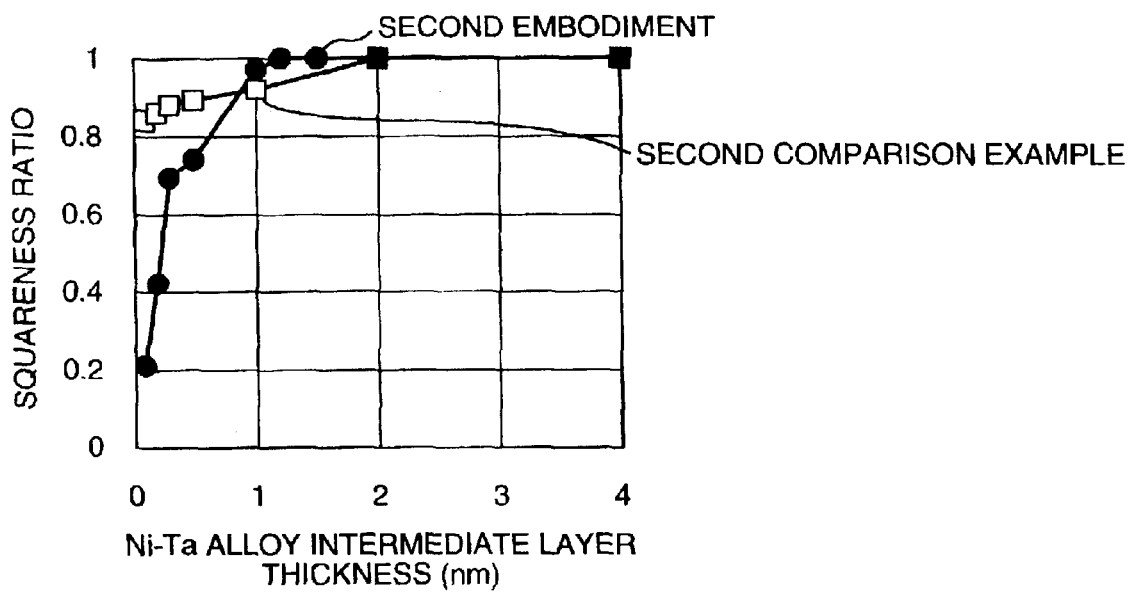
FIG. 12 is a diagram showing relations between a squareness ratio and a Ni—Ta alloy intermediate layer thickness of perpendicular magnetic recording media according to a second embodiment of the present invention and a second comparison example.

Coercive force and a squareness ratio of the recording layer measured with respect to media according to the second embodiment and the second comparison example are shown in FIGS. 11 and 12, respectively. A method for evaluating the coercive force and the squareness ratio is the same as that of the first embodiment. FIG. 11 shows dependence of coercive force upon the thickness of the Ni—Ta alloy intermediate layer. The coercive force becomes large only in the case where the MgO second intermediate layer serving as the oxygen-containing layer is used and the thickness of the Ni—Ta alloy third intermediate layer is in the range of 0.5 nm to 1.2 nm so as to serve as the island-shaped metallic layer. In the case where the Ni—Ta alloy third intermediate layer is thicker than 1.2 nm or the MgO second intermediate layer is not formed as in the second comparison example, only the coercive force of 270 kA/m or less is obtained. As for the squareness ratio, the orientation property of the recording layer is poor and the squareness ratio is low, in the case where the Ni—Ta alloy third intermediate formed on the MgO second intermediate layer is thin. By forming the Ni—Ta alloy third intermediate layer so as to have a thickness of at least 1 nm, however, the squareness ratio increases to approximately 1.0 and the problem in orientation property of the recording layer is also eliminated.

Figure 13:
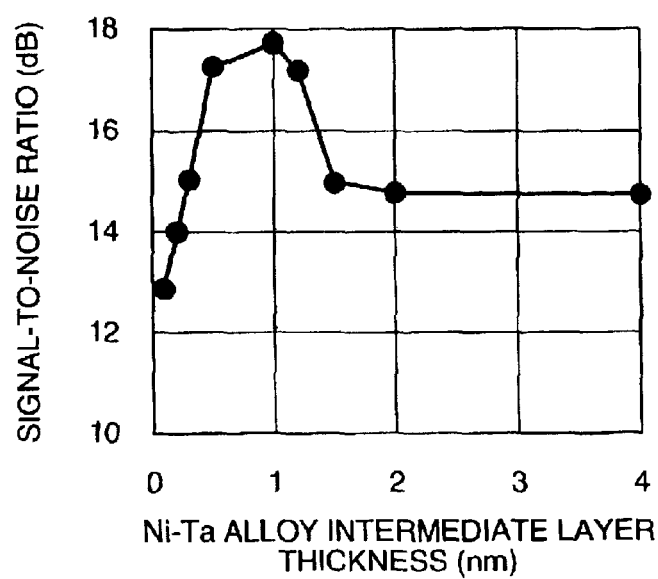
FIG. 13 is a diagram showing a relation between a signal-to-noise ratio and a Ni—Ta alloy intermediate layer thickness of a perpendicular magnetic recording medium according to a second embodiment of the present invention.

With respect to the media of the second embodiment and the second comparison example, evaluation of the recording and reproducing characteristic in the spin stand is conducted. The evaluation method is the same as that of the first embodiment. An evaluation result of the signal-to-noise ratio of the medium is shown in FIG. 13. In the medium in which the Ni—Ta alloy third intermediate layer having a thickness in the range of 0.5 nm to 1.2 nm is formed on the MgO intermediate layer, improvement in the signal-to-noise ratio and resolution of the medium can be ascertained. The signal-to-noise ratio of the medium is improved by approximately 3 dB at the maximum, and the tendency of dependence of the signal-to-noise ratio upon the thickness of the Ni—Ta alloy third intermediate layer is the same as that of the coercive force shown in FIG. 11.

It is considered that the effect of this embodiment is brought about by the fact that the island-shaped structures of the Ni—Ta alloy intermediate layer formed on the MgO intermediate layer containing oxygen promote isolation of crystal grains of the Co—Cr—Pt recording layer. It has been found that the effects of the present invention are obtained no matter whether the intermediate layer having island-shaped structures formed on the MgO intermediate layer is Ta as in the first embodiment or the Ni—Ta alloy in the present embodiment. Although the intermediate layer is formed at the same substrate temperature, however, the thickness range of the intermediate layer bringing about effects differs according to the composition. For example, the thickness range of the intermediate layer bringing about effects is the range of 0.2 nm to 0.7 nm in the case of Ta, and it is the range of 0.5 nm to 1.2 nm in the case of Ni—Ta. The reason is considered to be that the shape of the island-shaped metallic layer differs according to the kind of a substance that forms the island-shaped metallic layer. It is conjectured that the shape is apt to become flat in the case where metal having a high melting point, such as Ta, is used and the shape is apt to become a shape having large swell in the case where metal or an alloy having a lower melting point is used.

In order to examine the influence of a metallic element used in the third intermediate layer (island-shaped metallic layer) that is formed on the MgO second intermediate layer (oxygen-containing layer) in the medium of the second embodiment, a perpendicular magnetic recording medium that is different from the medium of the second embodiment only in the material used for the third intermediate layer and that is the same as the medium of the second embodiment in other film configurations and process conditions has been fabricated. The substrate temperature obtained immediately after formation of the third intermediate layer is set equal to three kinds of conditions: 170° C., 250° C., and 290° C., and the thickness range of the third intermediate layer that brings about effects of the present invention is examined. As metal used for the third intermediate layer, W, Nb, Mo and a Co-40 at % Cr alloy is selected. In the case where an intermediate layer composed of W, Nb or Mo is formed on the MgO intermediate layer, the change of coercive force according to the thickness of the third intermediate layer exhibits the same tendency as that of the case of the Ta intermediate layer in the first embodiment, and the thickness range of the third intermediate layer in which the effects of the present invention are obtained is found to be the range of 0.1 nm to 1 nm. On the other hand, in the case where a Co—Cr alloy intermediate layer is formed on the MgO intermediate layer, the change of coercive force according to the thickness of the third intermediate layer exhibits the same tendency as that of the case of the Ni—Ta alloy intermediate layer in the second embodiment, and the thickness range of the third intermediate layer in which the effects of the present invention are obtained is the range of 0.5 nm to 1.2 nm.

A perpendicular magnetic recording medium that uses $Al_2O_3$ instead of MgO as the second intermediate layer and uses Ru as the third intermediate layer, and that is the same as the medium of the second embodiment in other film configurations and process conditions has been fabricated. The substrate temperature obtained immediately after formation of the third intermediate layer is set equal to approximately 250° C. The change of coercive force according to the thickness of the third intermediate layer exhibits the same tendency as that of the case of the Ta intermediate layer in the first embodiment, and the thickness range of the Ru intermediate layer in which the effects of the present invention are obtained is found to be the range of 0.2 nm to 0.7 nm. The second intermediate layer need not be MgO, and it is ascertained that the effects of the present invention are obtained even if the second intermediate layer is composed of $Al_2O_3$. In the case where the third intermediate layer is formed directly on the Ni—Ta—Zr alloy first intermediate layer as in the first comparison example, and in the case where the third intermediate layer is formed directly on the Ni—Ta alloy first intermediate layer as in the second comparison example, the effects of the present invention are not obtained. Judging from this, it is considered that a metallic layer having isolated island-shaped structures is formed when a thin metallic layer is stacked on an oxide layer (oxygen-containing layer) of MgO or $Al_2O_3$.

<Third Embodiment>

A perpendicular magnetic recording medium of a third embodiment is fabricated under the same process conditions as those of the first embodiment. The film configuration is described below. As the substrate 10, crystallized glass having a thickness of 0.635 mm and a diameter of 65 mm is used. As the seed layer 11, a Ni-37.5 at % Ta-10 at % Zr alloy film having a thickness of 30 nm is used. As the soft magnetic underlayer 12, a Fe-8 at % Ta-12 at % C alloy having a thickness of 500 nm is used. As the first intermediate layer 13, a Ni-37.5 at % Ta-10 at % Zr alloy film having a thickness of 1 nm is used. As the second intermediate layer 14, a MgO film having a thickness of 1 nm is used. As a third intermediate layer 15, a Pd film is used. The substrate temperature immediately after formation of the Pd third intermediate layer is set to approximately 120° C. As regards the Pd third intermediate layer functioning as the island-shaped metallic layer, several kinds of samples differing in thickness have been fabricated. As the recording layer 16, an super-lattice film formed by stacking fifteen Co-15 at % B alloy layers each having a thickness of 0.3 nm and fifteen Pd layers each having a thickness of 1 nm is used. Formation of the super-lattice film is conducted by simultaneously discharging a Co—B alloy target and a Pd target each having a diameter of 90 mm attached to a magnetron cathode, which rotates at a speed of 100 revolutions per minute before the substrate. As sputtering gas used when forming the super-lattice film, mixed gas of argon and oxygen is used, and the total gas pressure is set equal to 5.6 Pa and the partial oxygen pressure is set equal to 70 mPa. As the protection layer 17, a carbon layer having a thickness of 5 nm is used.

As a sample to be compared with the medium of the third embodiment, a perpendicular magnetic recording medium that is different in only the configuration of the intermediate layer and that is the same as the third embodiment in other film configurations and process conditions is fabricated as a third comparison example. As for the intermediate layer configuration of the medium of the third comparison example, unlike the medium of the third embodiment, the MgO intermediate layer 14 serving as the oxygen containing layer is not formed, but the Pd intermediate layer 15 is formed directly on the Ni—Ta—Zr alloy intermediate layer. As to the Pd intermediate layer, several kinds of samples differing in thickness have been fabricated in the same way as the third embodiment.

Figure 14:
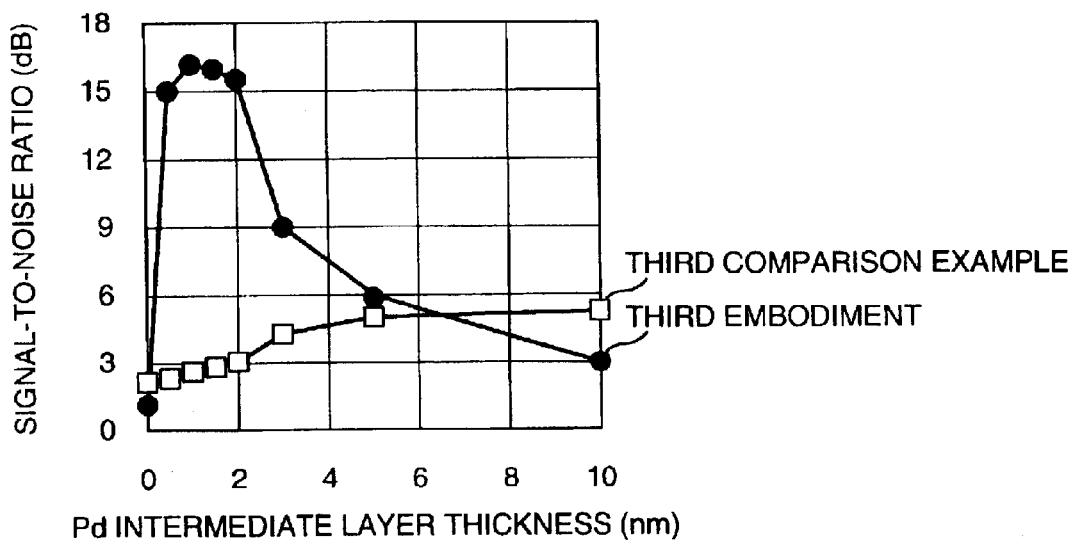
FIG. 14 is a diagram showing relations between a signal-to-noise ratio and a Pd intermediate layer thickness of perpendicular magnetic recording media according to a third embodiment of the present invention and a third comparison example.

With respect to the media of the third embodiment and the third comparison example, evaluation of the recording and reproducing characteristic in the spin stand is conducted. Its evaluation method is the same as that of the first embodiment. Evaluation results of the signal-to-noise ratio of the medium are shown in FIG. 14. In the medium of the third comparison example, the signal-to-noise ratio of the medium is less than 6 dB irrespective of the thickness of the Pd intermediate layer. On the other hand, in the medium in which the Pd intermediate layer having a thickness in the range of 0.5 nm to 2 nm is formed on the MgO intermediate layer, a favorable medium signal-to-noise ratio above 15 dB can be obtained. It has been found that a favorable noise characteristic is obtained as the effects of the present invention in the case where the super-lattice film obtained by stacking the Co alloy layer and the Pd layer is used as the recording layer, as well.

Figure 15:
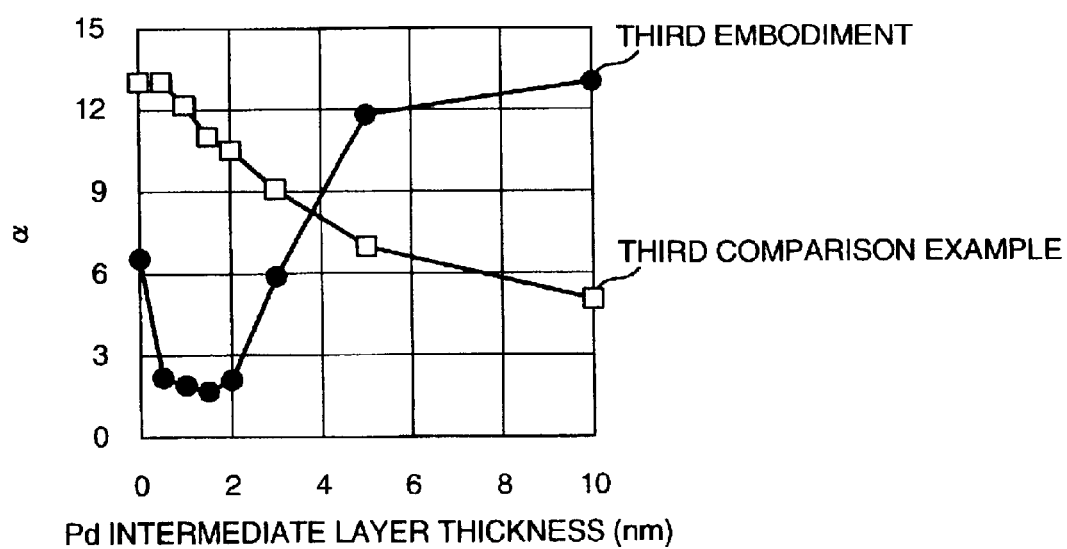
FIG. 15 is a diagram showing relations between α and a Pd intermediate layer thickness of perpendicular magnetic recording media according to a third embodiment of the present invention and a third comparison example.

The improvement of the signal-to-noise ratio of the medium is considered to be a result of the fact that the Pd intermediate layer on the MgO intermediate layer (oxygen containing layer) becomes a plurality of isolated island-shaped structures and magnetic isolation of the recording layer is promoted by crystal grains of the recording layer grown while taking the isolated island structures respectively as nuclei. In order to ascertain the magnetic isolation of the crystal grains of the recording layer, a medium that is exactly the same as those of the third embodiment and the third comparison example except that the soft magnetic underlayer 12 composed of the Fe-8 at % Ta-12 at % C alloy film is replaced by a Ni-37.5 at % Ta-10 at % Zr alloy film having the same thickness is fabricated, and magnetic characteristics of the samples are evaluated. The reason why the soft magnetic underlayer is not formed in these samples is to measure the magnetization quantity of only the recording layer by using a vibration sample magnetometer. The environment is set so as to make the sample temperature become approximately 25° C. While applying a magnetic field in a direction perpendicular to the film surface of the sample, the magnetic flux is detected and a magnetization curve is measured. Sweep of the magnetic field is conducted at a constant speed from +1200 kA/m to −1200 kA/m and from −1200 kA/m to +1200 kA/m in 20 minutes. Inclination of the obtained magnetization curve near the coercive force is obtained and this value is hereafter denoted by α. The value α changes depending on the strength of exchange couple between crystal grains. The value α becomes unity when there is no exchange couple, and the value α increases from unity as the exchange couple becomes strong. FIG. 15 shows dependence of α upon the thickness of the Pd intermediate layer. In the sample corresponding to the third comparison example, α is at least 5. On the other hand, in the case where the thickness of Pd intermediate layer in the third embodiment is in the range of 0.5 nm to 2 nm, α is 2 or less. It thus can be ascertained that the magnetic isolation between crystal grains is promoted remarkably.

A perpendicular magnetic recording medium using Pt, Au or Ag instead of Pd as a metallic material used for the third intermediate layer (serving as the island-shaped metallic layer), which is formed on the MgO second intermediate layer, in the medium of the third embodiment is fabricated. It has been found that the change of the medium signal-to-noise ratio according to the thickness of the third intermediate layer exhibits the same tendency as that in the case of the Pd intermediate layer of the third embodiment. In the third intermediate layer, a favorable result is obtained in the thickness range of 0.5 nm to 2 nm, in the same way as the case of the Pd intermediate layer.

<Fourth Embodiment>

Figure 16:
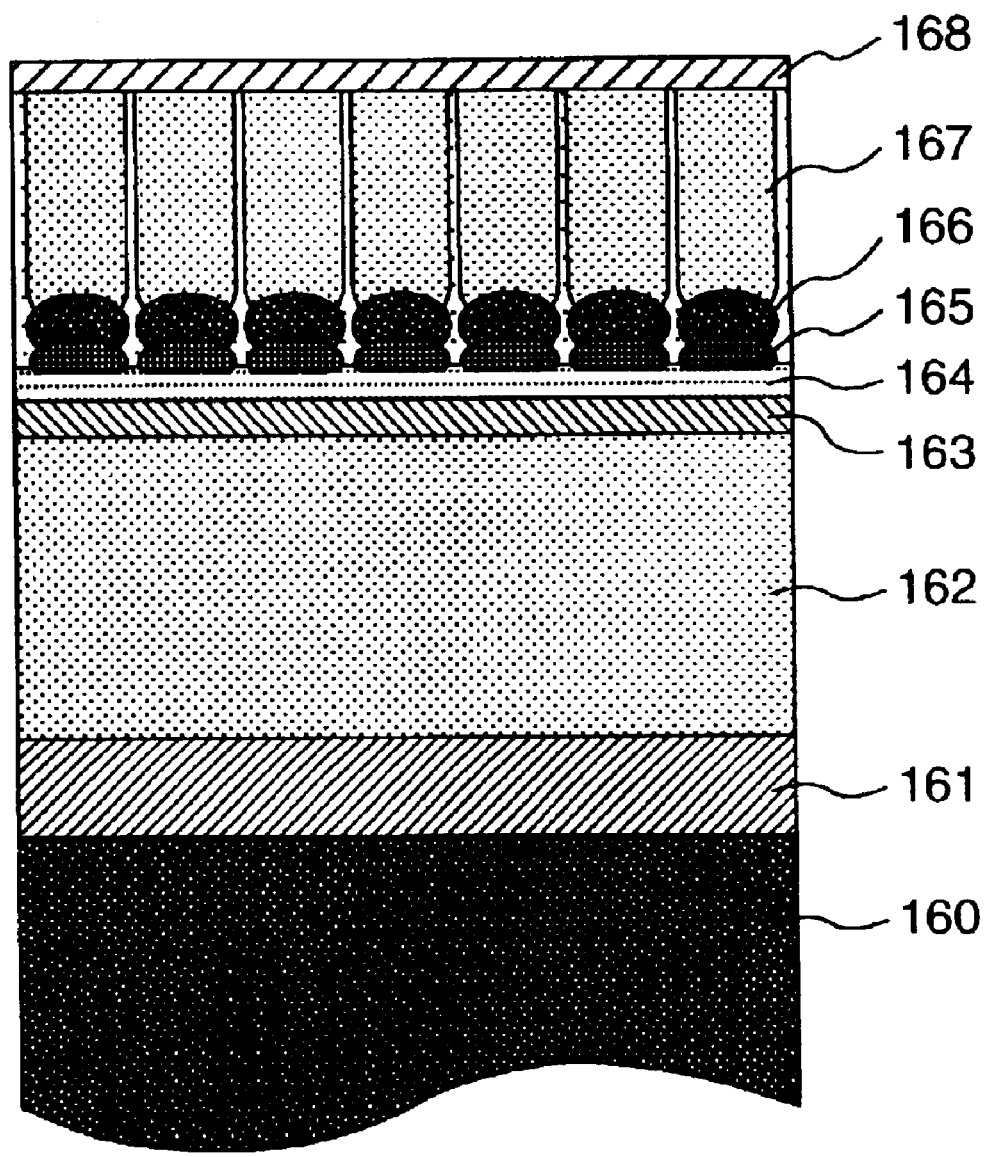
FIG. 16 is a schematic diagram showing a cross-sectional structure of each of perpendicular magnetic recording media according to fourth and fifth embodiments of the present invention.

A perpendicular magnetic recording medium of this embodiment is fabricated under process conditions similar to those of the third embodiment. A cross-sectional structure diagram representing a perpendicular magnetic recording medium of this embodiment is shown in FIG. 16. The film configuration is the same as that of the third embodiment except that a fourth intermediate layer 166 composed of a Pd-10 at % B alloy film having a thickness of 3 nm is formed between a Pd film of a third intermediate layer 165 and a recording layer 167 and an super-lattice film formed by stacking fifteen Co-10 at % B alloy layers each having a thickness of 0.35 nm and fifteen Pd layers each having a thickness of 1 nm is used as the recording layer. The fourth intermediate layer 166 composed of the Pd—B alloy is formed by using mixed gas of argon and oxygen as sputtering gas, setting the total gas pressure equal to 2.3 Pa and setting the partial oxygen pressure equal to 20 mPa. As for the Pd third intermediate layer functioning as the island-shaped metallic layer, several kinds of samples differing in thickness have been fabricated.

Figure 17:
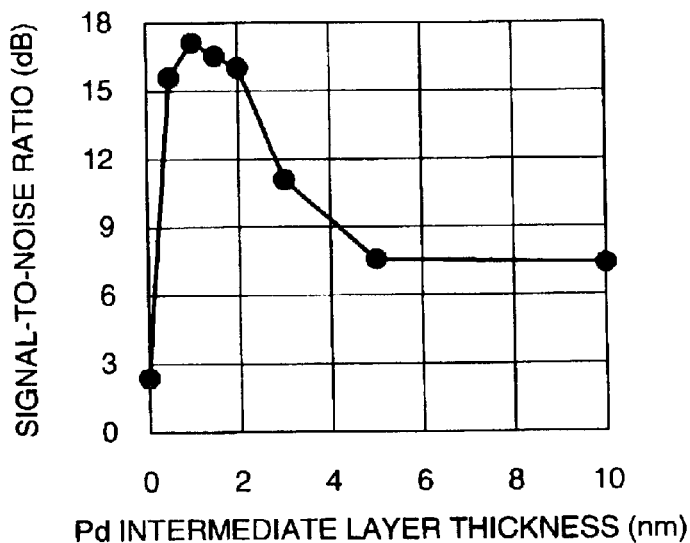
FIG. 17 is a diagram showing a relation between a signal-to-noise ratio and a Pd intermediate layer thickness of a perpendicular magnetic recording medium according to a fourth embodiment of the present invention.

With respect to the medium of the fourth embodiment, evaluation of the recording and reproducing characteristic in the spin stand is conducted. Its evaluation method is the same as that of the first embodiment. Evaluation results of the signal-to-noise ratio of the medium are shown in FIG. 17. In the medium in which the Pd intermediate layer having a thickness in the range of 0.5 nm to 2 nm is formed on the MgO intermediate layer, a favorable medium signal-to-noise ratio above 15 dB can be obtained. This is the same tendency as that of the third embodiment. However, the signal-to-noise ratio of the medium is improved. It is considered that the magnetic isolation of the crystal grains of the recording layer has been further promoted by using the fourth intermediate layer of the Pd—B alloy.

Figure 18:
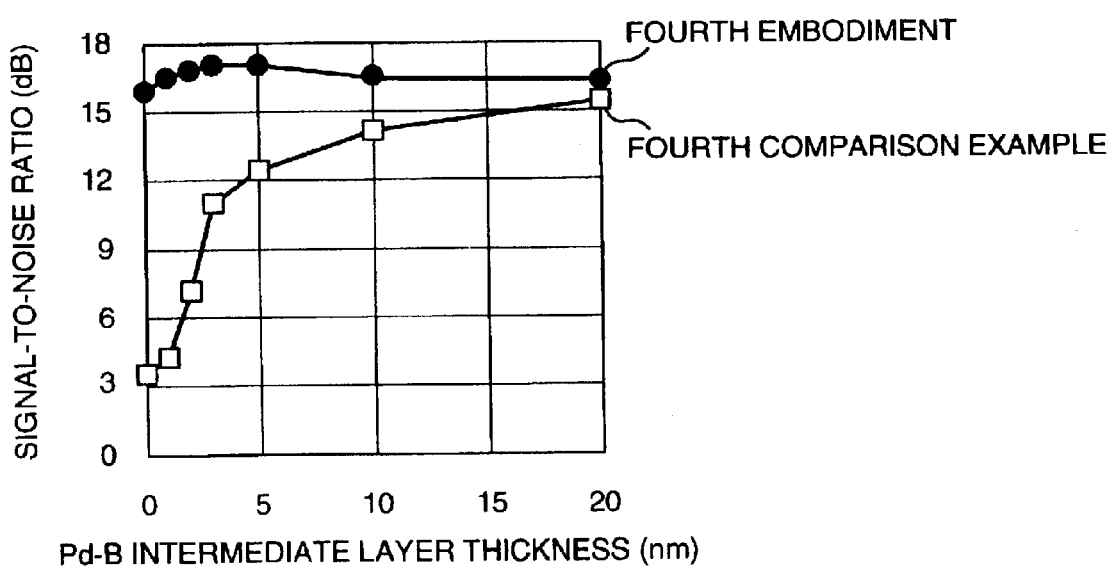
FIG. 18 is a diagram showing relations between a signal-to-noise ratio and a Pd—B alloy intermediate layer thickness of perpendicular magnetic recording media according to a fourth embodiment of the present invention and a fourth comparison example.

In order to examine the effect of the fourth intermediate layer of the Pd—B alloy, the thickness of the Pd third intermediate layer is fixed to 1.5 nm and several kinds of samples differing in thickness of the Pd—B alloy fourth intermediate layer have been fabricated. For the purpose of comparison, samples having exactly the same film configuration as those samples except that the MgO second intermediate layer is not formed are fabricated as a fourth comparison example. Evaluation of the recording and reproducing characteristic in the spin stand is conducted. As a result, dependence of the signal-to-noise ratio of the medium upon the thickness of the Pd—B intermediate layer as shown in FIG. 18 is obtained. In the medium of the fourth comparison example, the signal-to-noise ratio of the medium is degraded remarkably when the thickness of the Pd—B intermediate layer is below 10 nm. On the other hand, in the medium of the fourth embodiment, a favorable signal-to-noise ratio of the medium can be obtained even when the thickness of the Pd—B intermediate layer is below 5 nm. According to the present embodiment, a favorable noise is obtained without making the intermediate layer thick when the effects of the present invention are used. Without sacrificing the resolution and the recording efficiency, noise reduction can be implemented. In ascertaining this effect by using a Pd—Si alloy, a Pt—B alloy, Au and Ag as a material of the fourth intermediate layer, similar results are obtained.

Instead of forming the MgO film as a second intermediate layer 164, a sample having a Si film surface exposed to an atmosphere of oxygen is fabricated by bringing mixed gas of argon and oxygen in a chamber for five seconds so as to attain the oxygen partial pressure of 20 mPa. This is a sample in which the oxygen is not formed directly, but an oxygen-containing layer is formed by surface oxidation. However, it is ascertained that nearly the same characteristic is obtained except that the orientation property of the recording layer is slightly degraded and the effects of the present invention are obtained.

Furthermore, in the present embodiment, a sample in which a Pd film having a thickness of 1.5 nm is formed as a first intermediate layer 163 instead of forming the Ni—Ta—Zr alloy film has been fabricated. As a result of examining the orientation property of the recording layer by using the X-ray diffraction method, the diffraction peak intensity from the (111) plane of the recording layer has become ten times or more as compared with the case where the Ni—Ta—Zr alloy film is used as the first intermediate layer. It is found that the orientation property of the recording layer can be controlled by using the first intermediate layer. In the case where the super-lattice film formed by stacking the Co alloy layer and the Pd layer is used as the recording layer as in the present embodiment, the orientation property of the recording layer can be improved by using Pd, Pt, Au, Ag and Cu of a face-centered cubic structure or Ru and Ti of a hexagonal closed packed structure in the first intermediate layer.

Figure 19A:
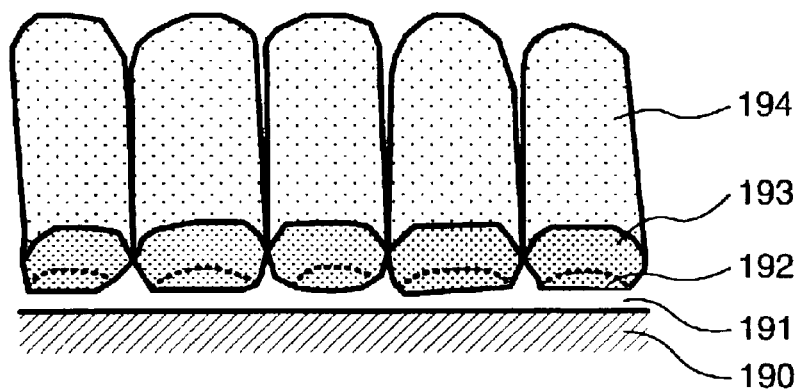
Figure 19B:
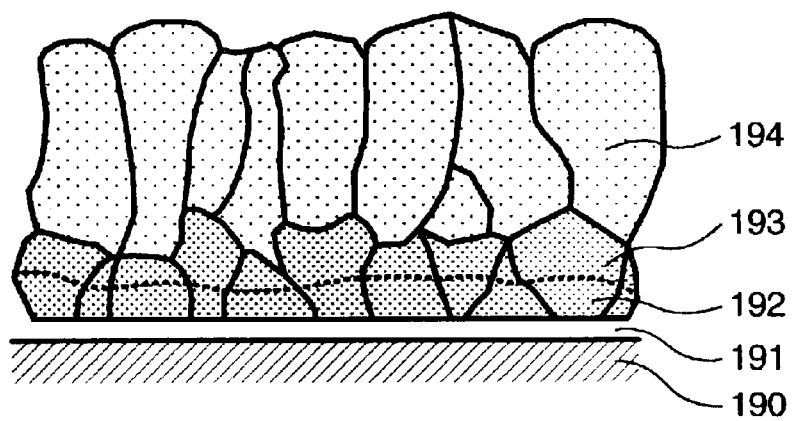
Figure 19C:
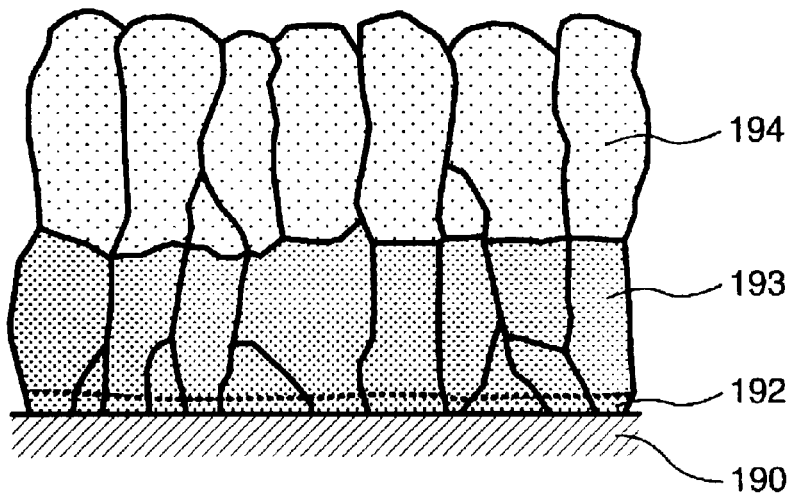

In order to examine the structure difference among the media of the fourth embodiment in further detail, the cross-sectional structure of the media are observed by using a transmission electron microscope of high resolution with respect to the following three kinds of samples among fabricated samples: a sample obtained by forming a Pd intermediate layer having a thickness of 1.5 nm and a Pd—B alloy intermediate layer having a thickness of 3 nm on an MgO intermediate layer; a sample obtained by forming a Pd intermediate layer having a thickness of 3 nm and a Pd—B alloy intermediate layer having a thickness of 3 nm on an MgO intermediate layer; and a sample obtained by forming a Pd intermediate layer having a thickness of 1.5 nm and a Pd—B alloy intermediate layer having a thickness of 20 nm without forming an MgO intermediate layer. FIGS. 19A, 19B and 19C show schematic sketches of the observation results of the three kinds of samples, respectively. The observation magnification is approximately one million and two hundred and fifty thousand magnifications. In order to prevent crystal grains that are adjacent backward or forward in the observation direction from being observed in an overlapped state, the observation sample is shaped so as to be very thin. In the observation region, the observation sample is made as thin as approximately 10 nm and the cross-sectional structure is observed.

A MgO intermediate layer 191 containing oxygen is observed clearly with a bright contrast. A Pd intermediate layer 192 can be hardly recognized because the difference from a Pd—B alloy intermediate layer 193 in contrast is small. An super-lattice film 194 formed by stacking a Co—B alloy layer and a Pd layer has a polycrystal structure clearly divided in the film plane direction. Its grain diameter is approximately 11 nm on average in any sample. Comparing the case where the Pd intermediate layer has a thickness of 1.5 nm as shown in FIG. 19A with case where the Pd intermediate layer has a thickness of 3 nm as shown in FIG. 19B, a difference is observed in the shape of the MgO intermediate layer. As for the shape of the MgO intermediate layer, in the case of FIG. 19A, its interface of the substrate side is flat whereas its interface of the surface side takes an uneven shape. On the other hand, in the case of FIG. 19B, as for the shape of the MgO intermediate layer, both the interface of the substrate side and the interface of the surface side are flat in the same way. Furthermore, in the case of FIG. 19A, the surface side interface of the MgO intermediate layer takes a nearly convex shape in positions corresponding to grain boundaries that divide crystal grains of the recording layer in the film plane direction. Viewed from another angle, in the case of FIG. 19A, a region of the metallic layer having a thickness of 1 nm or less adjacent to the surface side of the MgO intermediate layer takes a discontinuous shape divided in the film plane direction by regions differing in contrast. Furthermore, there is a feature that grain boundaries that divide crystal grains of the recording layer in the film plane direction are formed on the surface side so as to correspond to positions of the regions differing in contrast. Comparing media of three kinds respectively shown in FIGS. 19A, 19B and 19C with respect to the shape and size of crystal grains of the recording layer, the shape and size of crystal grains are obviously uniform, whereas they are greatly dispersed in FIGS. 19B and 19C. It is appreciated that the crystal grains of the recording layer are controlled effectively by using the Pd intermediate layer having the thickness of 1.5 nm. It has been found from the observation results heretofore described that the effects of the present invention can be obtained by forming a Pd intermediate layer having isolated island-shaped structures on a MgO intermediate layer serving as the oxygen containing layer as shown in FIG. 19A, thereby forming unevenness on the surface side interface of the MgO intermediate layer (the oxygen-containing layer), and furthermore forming a recording layer having a crystal structure corresponding to the uneven interface.

<Fifth Embodiment>

A perpendicular magnetic recording medium according to a fifth embodiment has a film configuration similar to that of the fourth embodiment, and it is fabricated under the same process condition. The fifth embodiment has the same film configuration as that of the fourth embodiment except that a Pd film having a thickness of 1 nm is used as the first intermediate layer 163 and a mixed film of a Co-17 at % Cr-14 at % Pt alloy and $SiO_2$ is used as the recording layer 167. Formation of the mixed film of the Co-17 at % Cr-14 at % Pt alloy and $SiO_2$ is conducted by simultaneously discharging a Co—Cr—Pt alloy target and a $SiO_2$ target each having a diameter of 90 mm attached to a magnetron cathode, which rotates at a speed of 100 revolutions per minute before the substrate. As sputtering gas, argon is used, and the gas pressure is set equal to 2.0 Pa. In order to ensure the evenness in the film thickness direction, the sputtering rate is limited to a low value and a film thickness of 20 nm is formed in 24 seconds. The mixture ratio between the Co—Cr—Pt alloy and $SiO_2$ can be adjusted by means of a ratio of power thrown into respective cathodes. In the present embodiment, the volume ratio of $SiO_2$ is set equal to 15%.

Samples of three kinds that are respectively 1.5 nm, 5 nm and 20 nm in thickness of the Pd third intermediate layer are fabricated. Coercive force is obtained by using a method similar to that of the first embodiment and using a Kerr effect magnetometer. Coercive force values measured with respect to samples that are respectively 1.5 nm, 5 nm and 20 nm in thickness of the Pd third intermediate layer are 435 kA/m, 175 kA/m, and 256 kA/m. The coercive force can be increased by making the intermediate layer thick. However, the coercive force can be further increased in the case where the thickness of the Pd third intermediate layer is 1.5 nm and the effects of the present invention are utilized. With respect to these samples, evaluation of the recording and reproducing characteristic in the spin stand is conducted by using the same method as that of the first embodiment. The medium signal-to-noise ratios of the samples that are 1.5 nm, 5 nm and 20 nm in thickness of the Pd third intermediate layer are 17.2 dB, 5.4 dB and 13.7 dB, respectively. A great difference thus occurs according to only a difference in the thickness of the Pd third intermediate layer. It has been found that the medium signal-to-noise ratio can also be remarkably improved by the effects of the present invention in the case where the mixed film of the Co—Cr—Pt alloy and $SiO_2$ is used for the recording layer.

<Sixth Embodiment>

A perpendicular magnetic recording medium according to the present embodiment has a film configuration similar to that of the fifth embodiment, and it is fabricated under the same process condition. The fifth embodiment has the same film configuration as that of the fifth embodiment except that a C film, a Si film, a CN film or a SiN film having a thickness of 1 nm is used as the second intermediate layer 164. Formation of the mixed film of the Co-17 at % Cr-14 at % Pt alloy and $SiO_2$ is conducted by using a target formed by mixing $SiO_2$ having a volume ratio of 17% with the Co—Cr—Pt alloy and using sputtering. As sputtering gas, argon is used, and the gas pressure is set equal to 2.0 Pa.

Evaluation of the recording and reproducing characteristic in the spin stand is conducted by using the same method as that of the first embodiment. The medium signal-to-noise is 17.1 dB, 16.9 dB, 16.8 dB and 16.9 dB respectively for the samples having a C film, a Si film, a CN film and a SiN film as the second intermediate layer. A favorable medium signal-to-noise is thus obtained in the same way as the case where an oxygen-containing layer is used for the second intermediate layer. It has been found that the medium signal-to-noise ratio can also be remarkably improved by the effects of the present invention in the case where a layer containing nitrogen, silicon or carbon is used instead of the oxygen-containing layer as the second intermediate layer.

<Seventh Embodiment>

Figure 20:
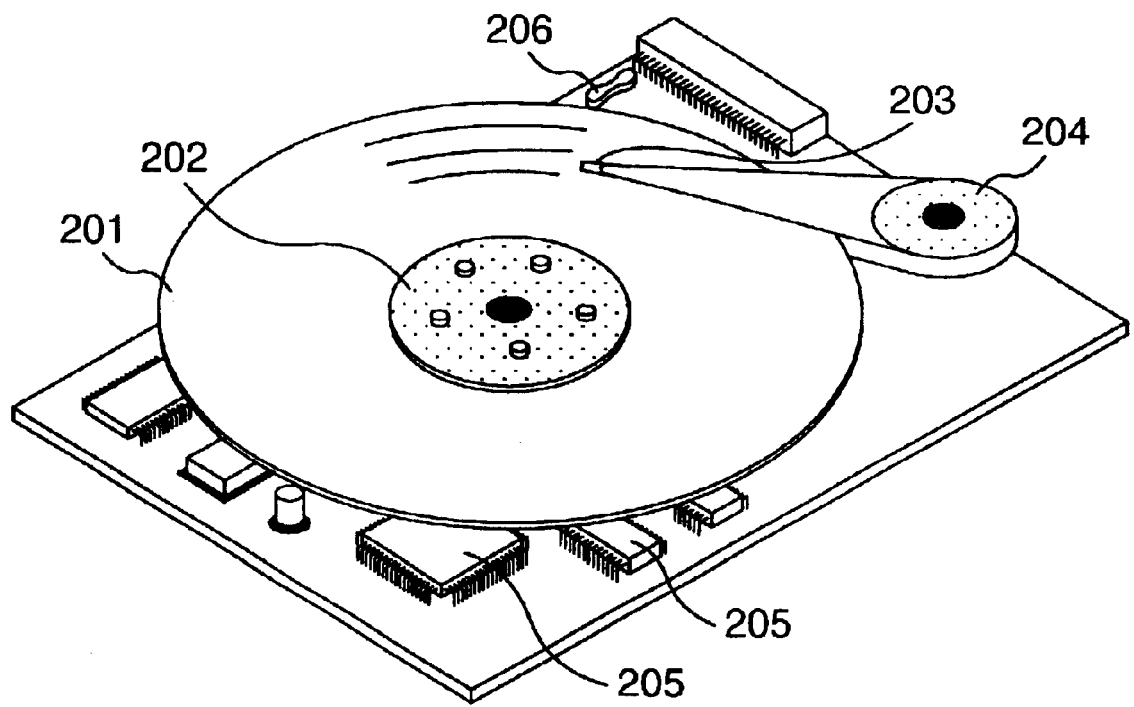
FIG. 20 is a schematic diagram showing an example of a magnetic storage apparatus according to the present invention.

A magnetic storage apparatus including a perpendicular magnetic recording medium 201 described with reference to the first to sixth embodiments, a drive unit 202 for driving the perpendicular magnetic recording medium, a magnetic head 203 including a recording section and a reproducing section, a unit 204 for causing a movement of the magnetic head relatively to the perpendicular magnetic recording medium, and a recording and reproducing signal processing unit 205 for inputting a signal to the magnetic head and reproducing a signal output from the magnetic head is formed as shown in FIG. 20. In the recording section of the magnetic head, a single-pole-type magnetic recording head is used. In the reproducing section of the magnetic head, a reproducing head formed of a magnetoresistance sensor is used. Under the condition that the linear recording density is 294,000 bits per cm and the track density is 51,000 tracks per cm, the recording and reproducing characteristic is evaluated with a magnetic spacing of 17 nm between the magnetic head and the magnetic film surface. In any case, specifications for the recording and reproducing characteristic of a magnetic storage apparatus having a surface recording density of 15 gigabits per square cm are satisfied sufficiently. In addition, even if the magnetic storage apparatus is left as it is at 70° C. for 100 hours, the degradation of the bit error rate is 0.5 digit or less.

In the present invention, it is not necessary to limit the substrate to a crystallized glass substrate. Even if any of materials known as substrates for magnetic recording media, such as an Al alloy substrate, a glass substrate or a Si substrate, is used, the present invention brings about effects. Also in the case where the magnetoresistance sensor for the reproducing head is formed of a magnetoresistance effect tunnel junction film, the present invention brings about effects.

According to the present invention, a manufacturing method of a perpendicular magnetic recording medium having a perpendicular magnetization film on a nonmagnetic substrate via a soft magnetic film preferably includes a step of forming an oxygen-containing layer or a nonmetallic element containing layer containing nitrogen, silicon or carbon, and a step of forming a metallic layer having structures isolated in island forms on the oxygen containing layer or the nonmetallic element-containing layer, between a step of forming the soft magnetic film and a step of forming the perpendicular magnetization film.

The manufacturing method preferably is a manufacturing method of a perpendicular magnetic recording medium in which the metallic layer has an average thickness in the range of 0.1 nm to 2 nm.

According to the present invention, in a magnetic storage apparatus including a perpendicular magnetic recording medium having a perpendicular magnetization film on a nonmagnetic substrate via a soft magnetic film, a drive unit for driving the perpendicular magnetic recording medium, a magnetic head having a recording section and a reproducing section, a unit for causing a movement of the magnetic head relatively to the perpendicular magnetic recording medium, and a recording and reproducing signal processing unit for inputting a signal to the magnetic head and reproducing a signal output from the magnetic head, preferably perpendicular magnetic recording medium includes an intermediate film formed of a plurality of layers between the soft magnetic film and the perpendicular magnetization film, the intermediate film including at least two layers, the at least two layers including an oxygen containing layer and a metallic layer formed on a surface side of the oxygen containing layer, the metallic layer including a plurality of convex structures isolated in island forms, crystal grains of the perpendicular magnetization film being formed so as to correspond to the convex structures, a recording section of the magnetic head being formed of a single-pole-type head, and a reproducing section of the magnetic head being formed of a giant magnetoresistance effect device or a tunnel junction film indicating a magnetoresistance effect.

According to the present invention, it is possible to magnetically isolate crystal grains of the recording layer of the perpendicular magnetic recording medium, and make the crystal grains fine and uniform, and simultaneously make the intermediate layer thin. In addition, it becomes possible to provide a perpendicular magnetic recording medium that is small in medium noise, resistive to thermal fluctuation, high in recording efficiency, and high in recording resolution, and provide a magnetic storage apparatus using such a perpendicular magnetic recording medium and capable of conducting high density recording.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A perpendicular magnetic recording medium having a perpendicular magnetization film on a nonmagnetic substrate via a soft magnetic film and an intermediate film,
    said intermediate film formed of a plurality of layers between said soft magnetic film and said perpendicular magnetization film,
    said intermediate film comprising at least two layers, said at least two layers comprising:
    an oxygen-containing layer, or a nonmetallic element containing layer containing nitrogen, silicon or carbon; and
    a metallic layer formed on a surface side of said oxygen-containing layer or said nonmetallic element-containing layer, said metallic layer having an average thickness in a range of 0.1 nm to 2 nm and including a plurality of isolated island-shaped structures,
    wherein the surface of the oxygen-containing layer or the nonmetallic element-containing layer as an underlining layer of said metallic layer is exposed around said island-shaped structures,
    said metallic layer is composed of an element selected from the group consisting of Ta, W, Nb, Mo or Ru, or an alloy including the element as a major ingredient by at %.

2. A perpendicular magnetic recording medium having a perpendicular magnetization film on a nonmagnetic substrate via a soft magnetic film and an intermediate film,
    said intermediate film formed of a plurality of layers between said soft magnetic film and said perpendicular magnetization film,
    said intermediate film comprising at least two layers, said at least two layers comprising:
    an oxygen-containing layer, or a nonmetallic element containing layer containing nitrogen, silicon or carbon; and
    a metallic layer formed on a surface side of said oxygen-containing layer or said nonmetallic element-containing layer, said metallic layer having an average thickness in a range of 0.1 nm to 2 nm and including a plurality of isolated island-shaped structures,
    wherein the surface of the oxygen-containing layer or the nonmetallic element-containing layer as an underlining layer of said metallic layer is exposed around said island-shaped structures,
    said metallic layer is composed of an element selected from the group consisting of Ni or Go, or an alloy including the element as a major ingredient by at %.

3. A perpendicular magnetic recording medium having a perpendicular magnetization film on a nonmagnetic substrate via a soft magnetic film and an intermediate film,
    said intermediate film formed of a plurality of layers between said soft magnetic film and said perpendicular magnetization film,
    said intermediate film comprising at least two layers, said at least two layers comprising:
    an oxygen-containing layer, or a nonmetallic element containing layer containing nitrogen, silicon or carbon; and
    a metallic layer formed on a surface side of said oxygen-containing layer or said nonmetallic element-containing layer, said metallic layer having an average thickness in a range of 0.1 nm to 2 nm and including a plurality of isolated island-shaped structures,
    wherein the surface of the oxygen-containing layer or the nonmetallic element-containing layer as an underlining layer of said metallic layer is exposed around said island-shaped structures,
    said metallic layer is composed of an element selected from the group consisting of Pd, Pt, Au or Ag, or an alloy including the element as a major ingredient by at %.

4. A perpendicular magnetic recording medium having a perpendicular magnetization film on a nonmagnetic substrate via a soft magnetic film and an intermediate film,
    said intermediate film formed of a plurality of layers between said soft magnetic film and said perpendicular magnetization film,
    said intermediate film comprising at least two layers, said at least two layers comprising:
    an oxygen-containing layer, or a nonmetallic element-containing layer containing nitrogen, silicon or carbon; and
    a metallic layer formed on a surface side of said oxygen-containing layer or said nonmetallic element-containing layer, said metallic layer including a plurality of isolated island-shaped structures,
    wherein the surface of the oxygen-containing layer or the nonmetallic element-containing layer as an underlining layer of said metallic layer is exposed around the island-shaped structures,
    crystal gains of said perpendicular magnetization film are formed so as to correspond to said isolated island-shaped structures, and
    said oxygen-containing layer is composed of MgO.

5. A perpendicular magnetic recording medium having a perpendicular magnetization film on a nonmagnetic substrate via a soft magnetic film and an intermediate film,
    said intermediate film formed of a plurality of layers between said soft magnetic film and said perpendicular magnetization film,
    said intermediate film comprising at least two layers, said at least two layers comprising:
    an oxygen-containing layer, or a nonmetallic element-containing layer containing nitrogen, silicon or carbon; and
    a metallic layer formed on a surface side of said oxygen-containing layer or said nonmetallic element-containing layer, said metallic layer including a plurality of isolated island-shaped structures, wherein the surface of the oxygen-containing layer or the nonmetallic element-containing layer as an underlining layer of said metallic layer is exposed around the island-shaped structures, crystal grains of said perpendicular magnetization film are formed so as to correspond to said isolated island-shaped structures, and said perpendicular magnetization film has a structure obtained by stacking periodically a layer composed of Co or an alloy including Co as a major ingredient by at % and a layer composed of Pd or an alloy including Pd as a major ingredient by at %.

6. A perpendicular magnetic recording medium having a perpendicular magnetization film on a nonmagnetic substrate via a soft magnetic film and an intermediate film, said intermediate film formed of a plurality of layers between said soft magnetic film and said perpendicular magnetization film, said intermediate film comprising at least two layers, said at least two layers comprising:

an oxygen-containing layer, or a nonmetallic element-containing layer containing nitrogen, silicon or carbon; and a metallic layer formed on a surface side of said oxygen-containing layer or said nonmetallic element-containing layer, said metallic layer including a plurality of isolated island-shaped structures, wherein the surface of the oxygen-containing layer or the nonmetallic element-containing layer as an underlining layer of said metallic layer is exposed around the island-shaped structures, crystal grains of said perpendicular magnetization film are formed so as to correspond to said isolated island-shaped structures, and said perpendicular magnetization film is formed on said metallic layer via an alloy layer containing oxygen.

7. The perpendicular magnetic recording medium according to claim 6, wherein said alloy layer containing oxygen comprises Pd, Pt, Au or Ag as a major ingredient by at %.

8. The perpendicular magnetic recording medium according to claim 6, wherein said alloy layer containing oxygen is composed of B or Si.

* * * * *